(12) United States Patent
Nomi et al.

(10) Patent No.: US 12,236,076 B2
(45) Date of Patent: Feb. 25, 2025

(54) DISPLAY SYSTEM AND POSITION INDICATING DEVICE

(71) Applicant: Wacom Co., Ltd., Saitama (JP)

(72) Inventors: Tsukasa Nomi, Saitama (JP); Hideki Fujimaki, Saitama (JP)

(73) Assignee: Wacom Co., Ltd., Saitama (JP)

(*) Notice: Subject to any disclaimer, the term of this patent is extended or adjusted under 35 U.S.C. 154(b) by 0 days.

(21) Appl. No.: 18/391,299

(22) Filed: Dec. 20, 2023

(65) Prior Publication Data

US 2024/0272781 A1    Aug. 15, 2024

(30) Foreign Application Priority Data

Feb. 14, 2023  (JP) ................. 2023-020457

(51) Int. Cl.
*G06F 3/04845* (2022.01)
*G06F 3/0354* (2013.01)
*G06F 3/038* (2013.01)

(52) U.S. Cl.
CPC ...... *G06F 3/04845* (2013.01); *G06F 3/03545* (2013.01); *G06F 3/0383* (2013.01); *G06F 2203/0384* (2013.01)

(58) Field of Classification Search
CPC ............... G06F 3/0383; G06F 3/04845; G06F 3/03545; G06F 2203/0384
See application file for complete search history.

(56) References Cited

U.S. PATENT DOCUMENTS

| 2012/0162127 A1* | 6/2012 | Onoda ................ G06F 3/04883 345/174 |
| 2012/0256830 A1* | 10/2012 | Oda ....................... G06F 3/041 345/157 |
| 2016/0224167 A1* | 8/2016 | Norieda ................ G06F 1/1626 |
| 2016/0231872 A1 | 8/2016 | Tamura et al. |

FOREIGN PATENT DOCUMENTS

JP    2019083023 A    5/2019

* cited by examiner

*Primary Examiner* — Doon Y Chow
(74) *Attorney, Agent, or Firm* — Seed IP Law Group LLP

(57) ABSTRACT

Provided is a display system including a position indicating device and an information processing apparatus having a display screen and a sensor that detects a position indicated by the position indicating device. The position indicating device includes a casing, an interaction circuit disposed inside the casing, where the interaction circuit exchanges a signal with the sensor, and a securing member that secures the casing to the display screen. The information processing apparatus includes a position detection circuit that detects the position indicated by the position indicating device that is secured to the display screen through the securing member, based on the signal exchanged by the interaction circuit, and a control circuit that performs control to display a given display image on the display screen with the position indicated by the position indicating device and detected by the position detection circuit used as a reference.

20 Claims, 17 Drawing Sheets

FIG.3
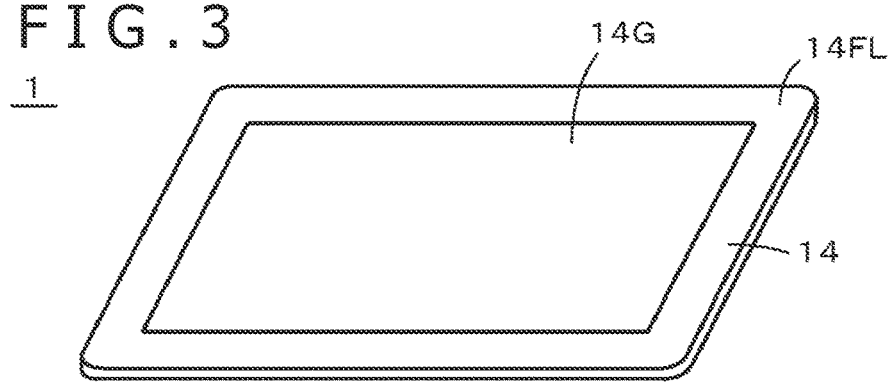
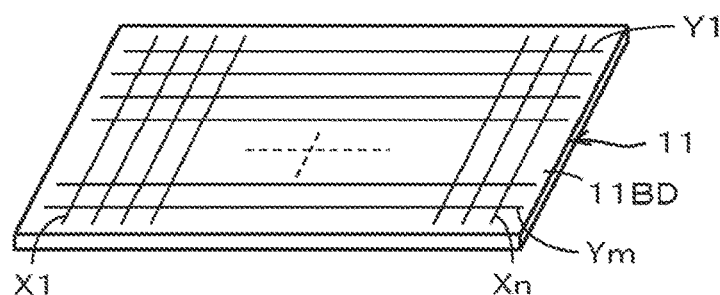
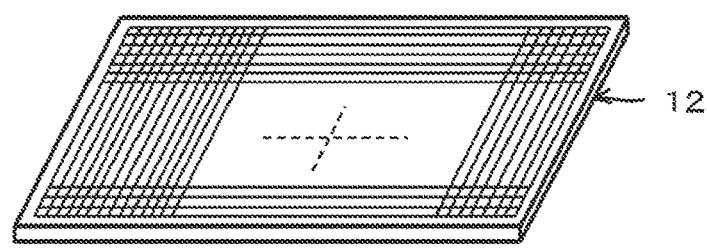
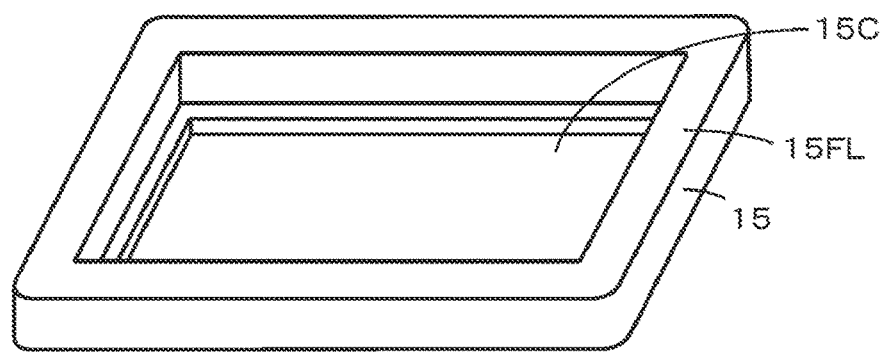

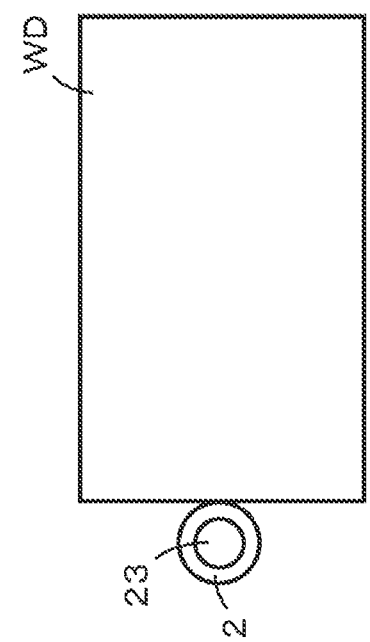
FIG. 12A
FIG. 12C
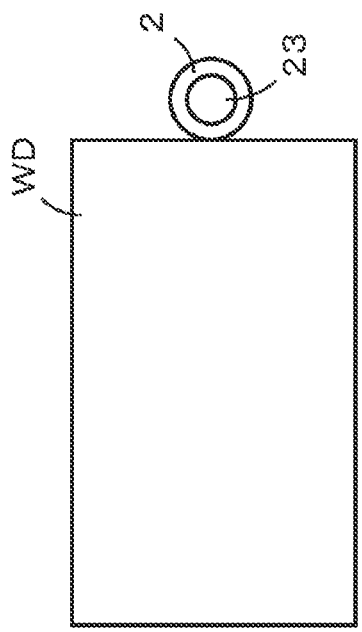
FIG. 12D
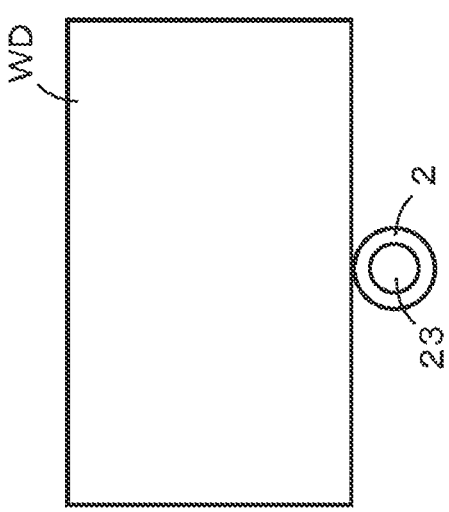
FIG. 12B

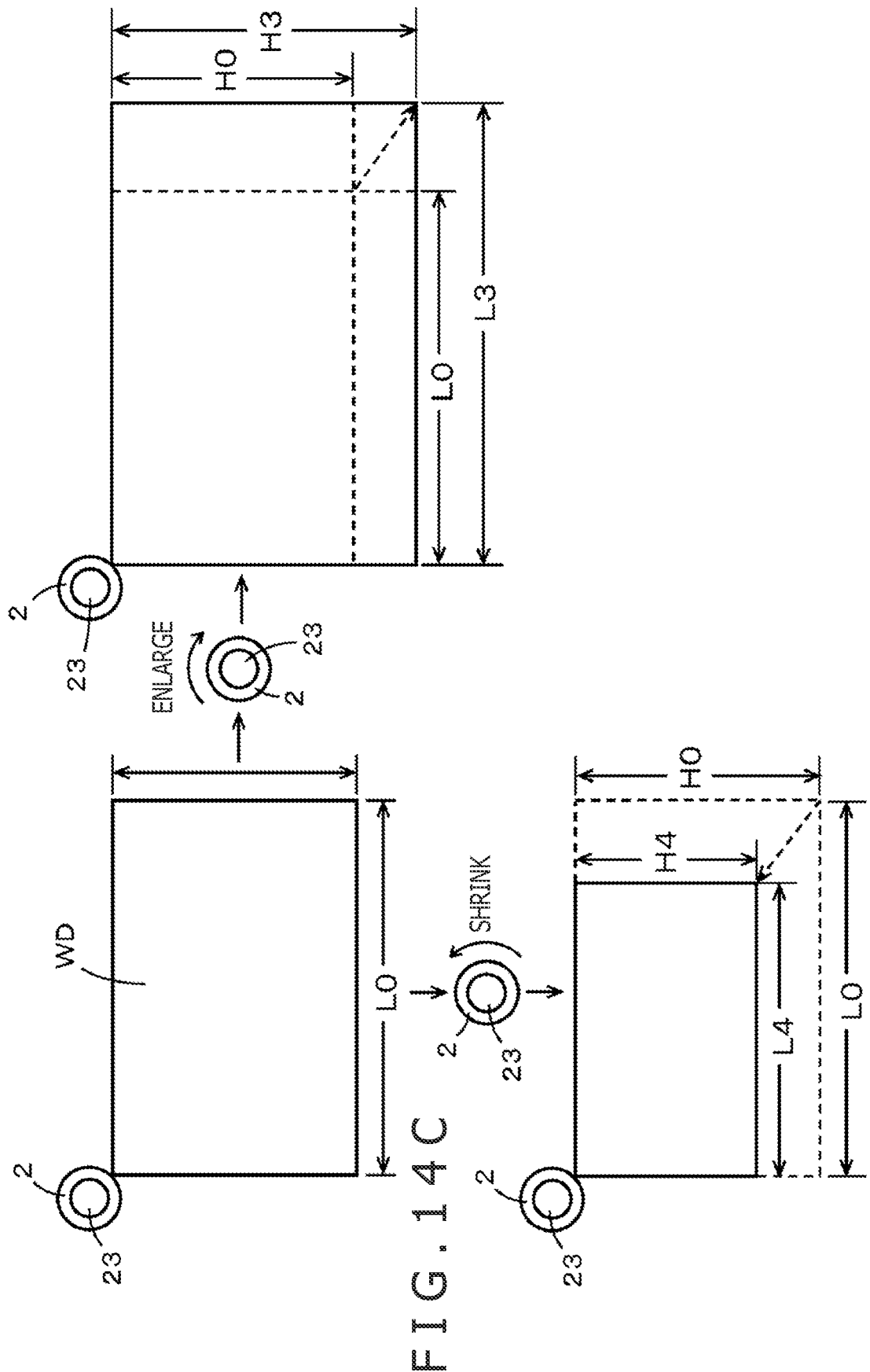

DISPLAY SYSTEM AND POSITION INDICATING DEVICE

BACKGROUND

Technical Field

This disclosure relates to a display system including a position indicating device and an information processing apparatus having a display unit and a sensor that detects a position indicated by the position indicating device, and to a position indicating device for use in such a display system.

Description of the Related Art

In a common information processing apparatus, such as a personal computer, one or a plurality of application programs (hereinafter referred to simply as an application(s)) are stored in a memory, and if an operation for activating one of the application(s) is performed, a window for the activated application is displayed on a display screen, and information processed by the application is displayed in a region of the window.

In this case, the display position, size, or the like of the window for the application can be changed by performing an operation using a pointing device, such as a mouse. In addition, the position of the window on the display screen is normally stored when the application is terminated and the window is closed such that the window will be opened at the stored position when the application is activated next.

In addition, there has been provided an information processing apparatus of this type which is configured to cause a window to be displayed at a display position specified by display position specification information obtained from another information processing apparatus (see, for example, JP 2019-83023A).

In a display system as mentioned above, it would be very convenient if a window could be displayed at a freely-selected position within a display screen as desired by a user. It would be more convenient if the position at which the window is to be displayed could be specified with a simple operation.

However, known display systems have a problem in that a user needs to perform cumbersome operations, such as an operation of moving a window to a desired position after the window is opened, and an operation of specifying a desired display position of the window by using an information processing apparatus other than the information processing apparatus that displays the window on the display screen.

BRIEF SUMMARY

In view of the above circumstances, embodiments of this disclosure provide a display system.

According to an embodiment of this disclosure, there is provided a display system including a position indicating device and an information processing apparatus having a display screen and a sensor that, in operation, detects a position indicated by the position indicating device. The position indicating device includes a casing, an interaction circuit disposed inside the casing, wherein the interaction circuit, in operation, exchanges a signal with the sensor of the information processing apparatus, and a securing member that, in operation, secures the casing to the display screen of the information processing apparatus. The information processing apparatus includes a position detection circuit that, in operation, detects the position indicated by the position indicating device in a state of the casing being secured to the display screen through the securing member, based on the signal exchanged by the interaction circuit of the position indicating device with the sensor of the information processing apparatus, and a control circuit that, in operation, performs control to display a given display image on the display screen with the position indicated by the position indicating device and detected by the position detection circuit used as a reference.

In the display system having the above-described configuration, if the position indicating device is secured to the display screen of a display unit of the information processing apparatus, a display processing circuit of the information processing apparatus causes the given display image to be displayed on the display screen with the position indicated by the position indicating device used as a reference. Accordingly, a user can secure the position indicating device to the display screen of the information processing apparatus at a desired position selected on the display screen, and thereby cause the given display image, e.g., a window, to be displayed thereon with the selected position at which the position indicating device has been secured used as a reference.

BRIEF DESCRIPTION OF THE SEVERAL VIEWS OF THE DRAWINGS

FIG. 3 is an exploded perspective view for explaining the example structure of the information processing apparatus of the display system according to an embodiment of this disclosure;

FIGS. 12A, 12B, 12C, and 12D are each a diagram for explaining an example operation of the information processing apparatus of the display system according to an embodiment of this disclosure;

FIGS. 14A to 14C depict a diagram for explaining example operations of the information processing apparatus of the display system according to an embodiment of this disclosure;

DETAILED DESCRIPTION

Hereinafter, display systems according to embodiments of this disclosure will be described with reference to the accompanying drawings.

First Embodiment

Figure 1:
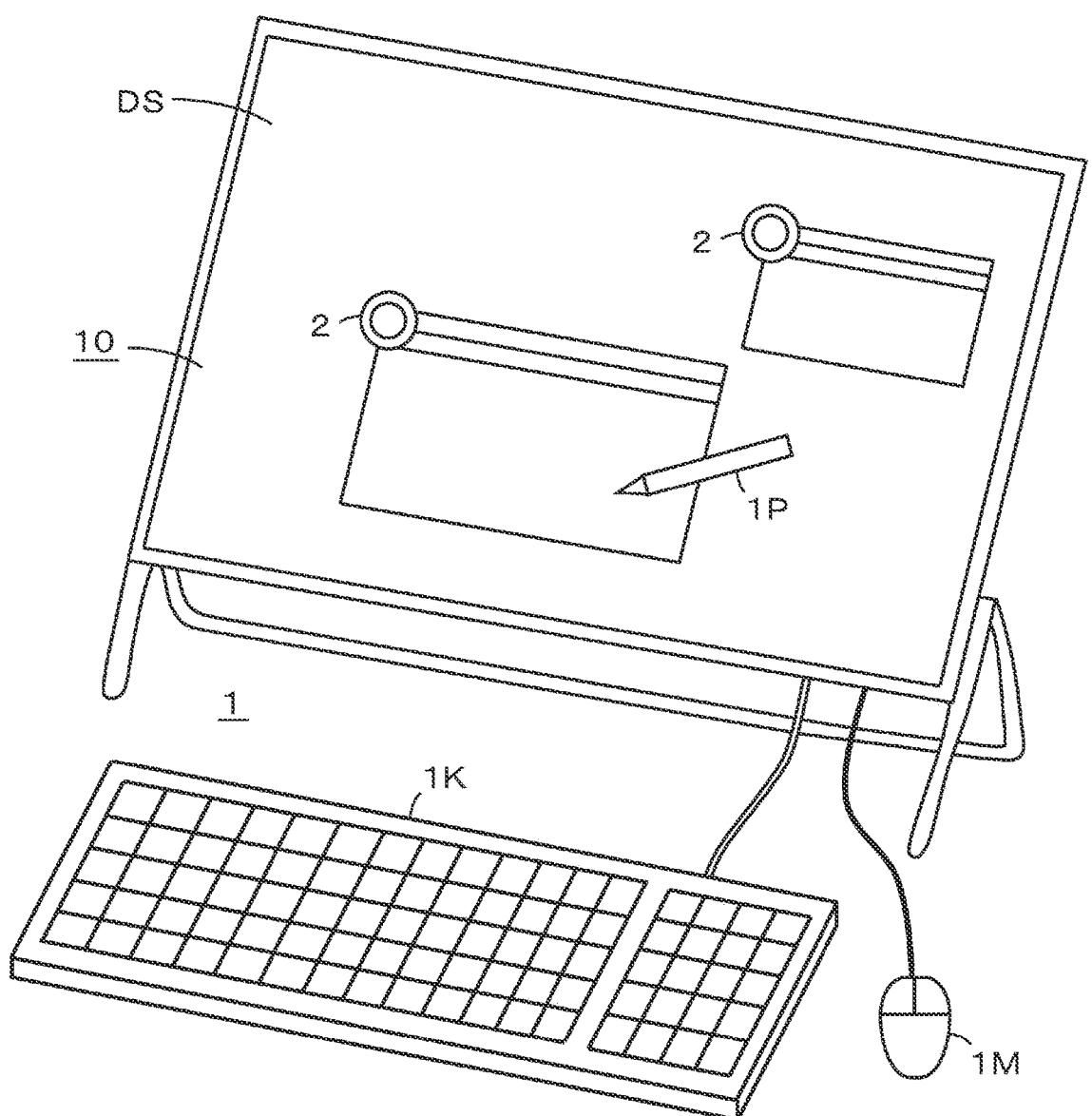
FIG. 1 is a diagram for explaining an outline of a display system according to an embodiment of this disclosure.

FIG. 1 is a diagram illustrating an outline of a display system according to a first embodiment of this disclosure, and the display system includes one or more position indicating devices 2 and an information processing apparatus 1 including a display device (display unit) having a display screen DS. In this embodiment, the information processing apparatus 1 includes an information processing apparatus body 10 formed by a computer having the display screen DS, a keyboard 1K, a mouse 1M, and an electronic pen 1P. The keyboard 1K, the mouse 1M, and the electronic pen 1P are each an input device for the information processing apparatus body 10, and in this example, the keyboard 1K and the mouse 1M are each connected to the information processing apparatus body 10. The keyboard 1K and the mouse 1M are each connected thereto in a wired manner in this embodiment, but may alternatively be connected thereto in a wireless manner. In addition, the electronic pen 1P is configured to be capable of interacting and exchanging signals with a position detection sensor 11, which will be described below, to thereby perform a position indication input and a writing input on the display screen DS to input an indicated position and a writing into the information processing apparatus body 10.

As illustrated in FIG. 1, in the display system according to the first embodiment, the information processing apparatus body 10 is placed on, for example, a desk such that the display screen DS is angled with respect to a top surface of the desk, the top surface being horizontally oriented. Each position indicating device 2 includes a securing member for enabling the position indicating device 2 to be secured to the display screen DS of the information processing apparatus 1. While the display screen DS is angled with respect to a horizontal plane in the first embodiment, the position indicating device 2 is configured to be capable of being secured to the display screen DS through the securing member, which is formed by magnet members (e.g., permanent magnets) capable of magnetic attraction in this example, such that the position indicating device 2 will not fall off.

Example Structure of Information Processing Apparatus Body 10

Figure 2:
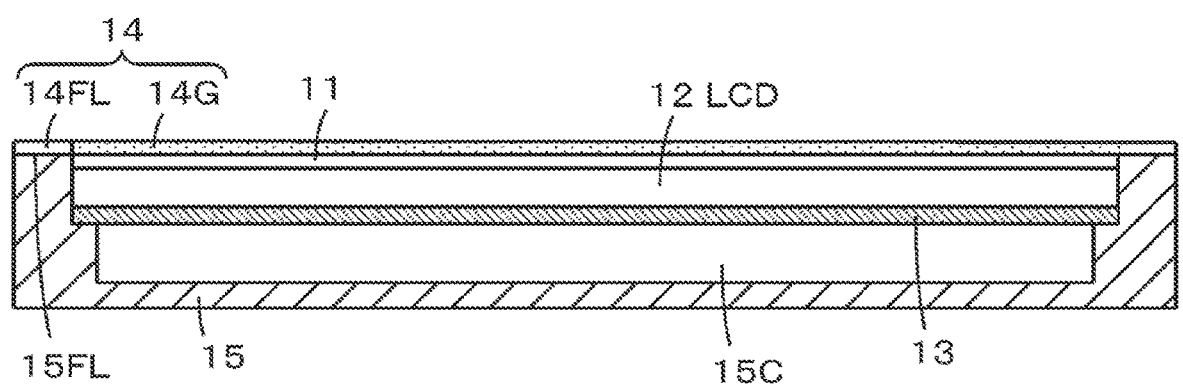
FIG. 2 is a sectional view for explaining an example structure of an information processing apparatus of the display system according to an embodiment of this disclosure.

FIG. 2 is a sectional view of the information processing apparatus body 10, and FIG. 3 is an exploded perspective view of the information processing apparatus body 10. In this example, the information processing apparatus body 10 has a computer and other necessary electronic components housed on a rear side of the display screen DS.

As illustrated in FIGS. 2 and 3, the information processing apparatus body 10 according to this embodiment includes the position detection sensor 11, a display device 12, a magnetic plate 13, an upper case 14, and a lower case 15. A printed circuit board or the like (not illustrated) having electronic components arranged thereon is disposed at a bottom of the lower case 15. The display device 12 is formed by, for example, a flat-panel display device, such as a liquid crystal display or an organic electroluminescence (EL) display. The position detection sensor 11 is disposed in such a manner as to cover an upper side of the display screen DS of the display device 12. In this case, the position detection sensor 11 and the display device 12 are disposed such that a position detection region of the position detection sensor 11 substantially coincides with a display region of the display screen of the display device 12.

In this embodiment, the position detection sensor 11 is a capacitive sensor, and includes a transparent board 11BD and groups of transparent electrodes disposed thereon, the groups of transparent electrodes being made up of a plurality of electrodes having a light-transmitting property. The groups of transparent electrodes include m (m>1) first transparent electrodes Y1 to Ym arranged in a Y-axis direction and n (n>1) second transparent electrodes X1 to Xn arranged in an X-axis direction perpendicular to the Y-axis direction, and have a grid electrode pattern in which the first transparent electrodes Y1 to Ym are perpendicular to the second transparent electrodes X1 to Xn. Each of the first transparent electrodes Y1 to Ym and the second transparent electrodes X1 to Xn is formed by a conductor made of an electrically conductive material having a light-transmitting property, e.g., an indium tin oxide (ITO) film. The electronic pen 1P is, for example, an active capacitive electronic pen, which matches the position detection sensor 11, which is of a capacitive type.

In addition, in this embodiment, the magnetic plate 13, which is formed by, for example, an iron plate, is disposed on the rear side of the display screen DS of the liquid crystal display (LCD) 12. As described below, the magnetic plate 13 is used to enable any position indicating device 2 to be secured to the display screen DS of the information processing apparatus body 10 at a desired position through magnetic attraction force of the magnet members, which are an example of the securing member of the position indicating device 2, when the position indicating device 2 is placed on the display screen DS of the information processing apparatus body 10. In this example, the magnetic plate 13 is formed by an iron plate.

The upper case 14 includes a frame portion 14FL made of, for example, a synthetic resin, and a rectangular glass plate 14G supported by the frame portion 14FL. The glass plate 14G has a size corresponding to that of the whole position detection region of the position detection sensor 11, which is disposed in a planar arrangement on a display-screen side of the display device 12. Meanwhile, the lower case 15 is made of, for example, a synthetic resin, and has a recessed portion 15C surrounded by a frame wall 15FL, and the printed circuit board or the like (not illustrated) having the electronic components arranged thereon. The position detection sensor 11, the display device 12, and the magnetic plate 13 are housed in the recessed portion 15C, and thereafter, the frame portion 14FL of the upper case 14 is, for example, adhered to an upper surface of the frame wall 15FL of the lower case 15 through an adhesive, so that the recessed portion 15C is closed, and assembly of the information processing apparatus body 10 is complete.

Example Electric Circuit Configuration of Information Processing Apparatus 1

Figure 4:
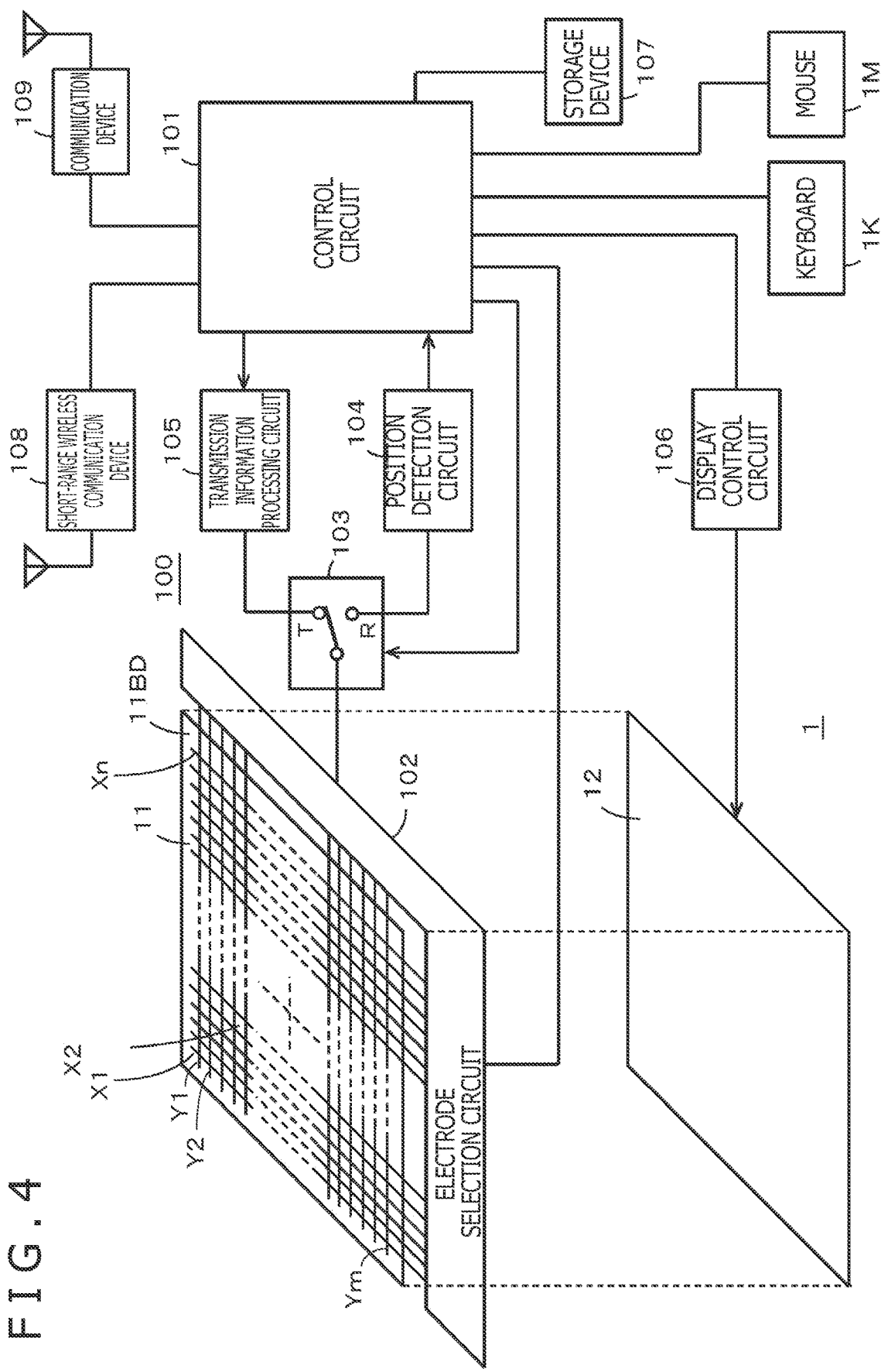
FIG. 4 is a diagram for explaining an example electrical configuration of the information processing apparatus of the display system according to an embodiment of this disclosure.

FIG. 4 illustrates an example electric circuit configuration of the information processing apparatus 1 having the above-described structure.

The position detection sensor 11 and the display device 12 are each electrically connected to processing circuitry 100 of the information processing apparatus body 10. The processing circuitry 100 includes a control circuit 101 that controls the whole of the information processing apparatus body 10, an electrode selection circuit 102, a change switch circuit 103, a position detection circuit 104, a transmission information processing circuit 105, a display control circuit 106, a storage device 107, a short-range wireless communication device 108, and a communication device 109. The electrode selection circuit 102, the change switch circuit 103, the position detection circuit 104, the transmission information processing circuit 105, the display control circuit 106, the storage device 107, the short-range wireless communication device 108, and the communication device 109 are each connected to the control circuit 101. In one or more implementations, the control circuit 101 includes a processor and a memory storing process-readable instructions that, when executed by the processor, cause the control circuit 101 to perform the functions described herein.

Each of the m first transparent electrodes Y1 to Ym and the n second transparent electrodes X1 to Xn of the groups of transparent electrodes of the position detection sensor 11 is connected to the electrode selection circuit 102, and the electrode selection circuit 102 selects one or more transparent electrodes from among the first transparent electrodes Y1 to Ym and the n second transparent electrodes X1 to Xn according to a control signal from the control circuit 101.

The electrode selection circuit 102 is connected to the change switch circuit 103. The change switch circuit 103 enables a switch to be made between a reception mode and a transmission mode according to a switch control signal from the control circuit 101. In the reception mode, a signal is received via the position detection sensor 11. In the transmission mode, information is transmitted via the position detection sensor 11.

Specifically, in the reception mode, in which a signal is received from the position indicating device 2 via the position detection sensor 11 as described below, the change switch circuit 103 selects a terminal R according to the switch control signal from the control circuit 101, thereby connecting a conductor(s) selected by the electrode selection circuit 102 to an input terminal of the position detection circuit 104. Meanwhile, in the transmission mode, in which information is transmitted via the position detection sensor 11, the change switch circuit 103 selects a terminal T according to the switch control signal from the control circuit 101, thereby connecting the conductor(s) selected by the electrode selection circuit 102 to an output terminal of the transmission information processing circuit 105. In this embodiment, the control circuit 101 of the information processing apparatus body 10 is configured to make the transmission mode and the reception mode in operation in a time-division manner in synchronism with the position indicating device 2 as described below.

The position detection circuit 104 detects the signal level of reception signals obtained from the transparent electrodes selected by the electrode selection circuit 102, and detects the position indicated by the position indicating device 2, from a result of the detection. Then, the position detection circuit 104 supplies information as to the detected position to the control circuit 101. The control circuit 101 performs a process as described below, on the basis of the received information as to the position indicated by the position indicating device 2. In addition, in this embodiment, the position detection circuit 104 also performs a process of detecting rotation (i.e., the amount and direction of rotation) of the position indicating device 2 from reception signals obtained from a plurality of transparent electrodes selected by the electrode selection circuit 102 as described below, and also performs a process of supplying information as to the detected rotation to the control circuit 101.

Moreover, in this embodiment, the position detection circuit 104 also performs a process of detecting unique identification information (hereinafter referred to as a device ID) sent from the position indicating device 2 from reception signals obtained from the transparent electrodes selected by the electrode selection circuit 102, and supplying the detected device ID to the control circuit 101.

The transmission information processing circuit 105 converts (modulates) transmission information obtained from the control circuit 101 to a signal suitable for transmission to the position indicating device 2 via the position detection sensor 11, and supplies the signal obtained by the conversion (modulation) to the transparent electrodes selected by the electrode selection circuit 102, through the change switch circuit 103, to send out the signal to the position indicating device 2.

The display control circuit 106 is connected to the display device 12, and, upon receipt of display image information from the control circuit 101, performs control to cause a display image corresponding to the display image information to be displayed on the display screen of the display device 12.

The storage device 107 allows information to be stored therein or read therefrom on the basis of control by the control circuit 101.

The short-range wireless communication device 108 is used to communicate with a short-range wireless communication device provided in the position indicating device 2, in a wireless manner as described below, and, in this embodiment, is a wireless communication device compliant with the Bluetooth (registered trademark) standard. The control circuit 101 is configured to be capable of performing a process of causing information acquired via the short-range wireless communication device 108 to be stored in the storage device 107 and a process of supplying an image corresponding to the acquired information to the display control circuit 106 to cause the image to be displayed on the display screen of the display device 12.

In this embodiment, the communication device 109 is, for example, used to communicate (e.g., exchange an email) with a particular party or connect with the Internet via a wireless communication channel. The control circuit 101 is configured to be capable of performing a process of causing information acquired via the communication device 109 to be stored in the storage device 107 and a process of supplying an image corresponding to the acquired information to the display control circuit 106 to cause the image to be displayed on the display screen of the display device 12.

In the storage device 107, given information is stored in advance, and results of processing in the control circuit 101, information received from the position indicating device 2, and so on are also stored therein under control of the control circuit 101.

In this embodiment, the control circuit 101 is formed by a computer, and various applications are installed therein. Needless to say, an application can be added thereto at a later time from the Internet via the communication device 109, for example. In this embodiment, the applications installed in the control circuit 101 include applications each registered in such a manner as to be associated with a separate one of the unique device IDs of the respective position indicating devices 2.

Example Structure of Position Indicating Device 2

The position indicating device 2 according to this embodiment includes a casing 21 and an interaction circuit 3 disposed in the casing 21. The interaction circuit 3 interacts and exchanges signals with the position detection sensor 11 of the information processing apparatus body 10 to indicate a position. In addition, the position indicating device 2 according to this embodiment further includes magnets 22 as an example of the securing member, which is used to secure the casing 21 to the display screen DS of the display device 12 of the information processing apparatus body 10, thereby securing the position indicating device 2 to the display screen DS.

Figure 5A:
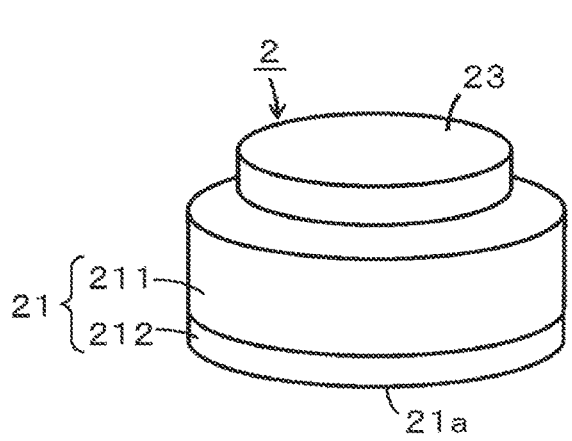
FIGS. 5A and 5B are diagrams illustrating an example external structure of a position indicating device of the display system according to an embodiment of this disclosure.
Figure 5B:
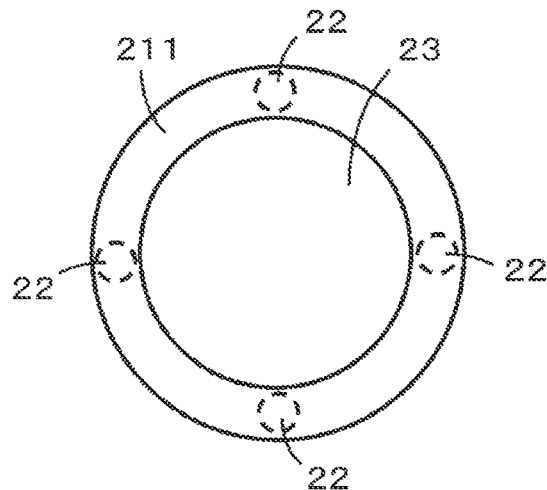
Figure 6:
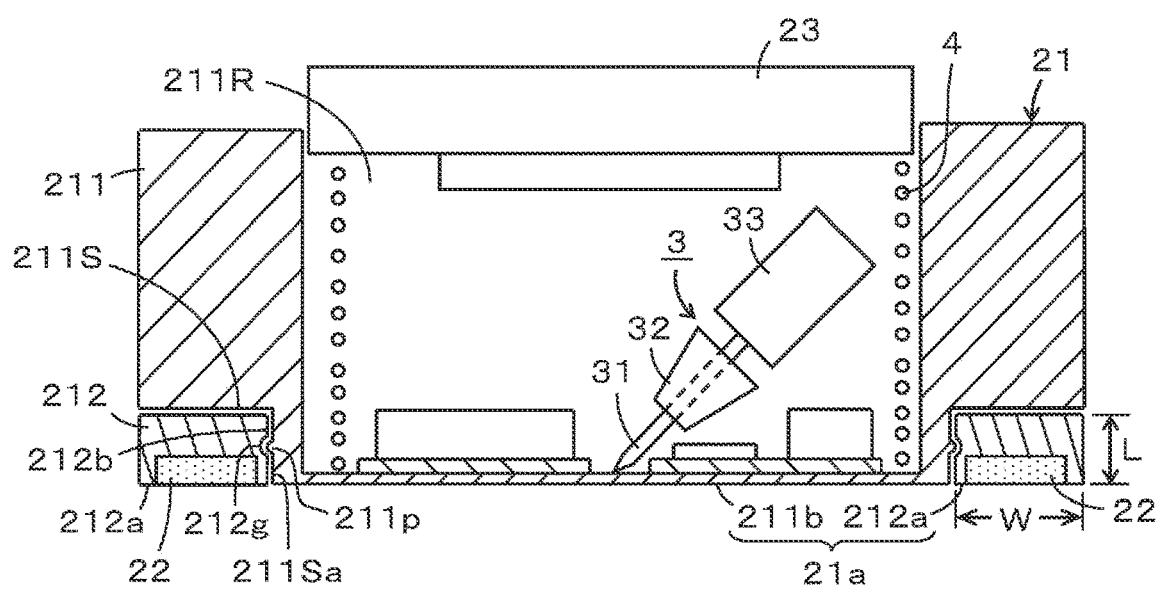
FIG. 6 is a schematic sectional view for explaining an example structure of the position indicating device of the display system according to an embodiment of this disclosure.

FIGS. 5A and 5B are diagrams for explaining the external appearance of the position indicating device 2 according to this embodiment. FIG. 5A is an external perspective view of the position indicating device 2, and FIG. 5B is a top view of the position indicating device 2. FIG. 6 is a schematic sectional view of the position indicating device 2.

In this example, as illustrated in FIGS. 5A and 5B, the position indicating device 2 includes the casing 21, which is disk-shaped or columnar in external appearance. In addition, in this embodiment, the magnets 22 are disposed at a bottom surface 21a of the disk-shaped or columnar casing 21. Moreover, a push button 23 is disposed at an upper surface of the casing 21, the upper surface lying on a side opposite to the bottom surface 21a.

In this embodiment, the number of magnets 22 may be one or more than one, and in the example of FIGS. 5A and 5B, the magnets 22 are made up of four disk-shaped permanent magnets disposed at angular intervals of 90 degrees. The magnets 22 form a securing member for securing the position indicating device 2 to the display screen DS as a result of being magnetically attracted and fastened to the magnetic plate 13 of the above-described information processing apparatus body 10 when the bottom surface 21a of the position indicating device 2 is brought into contact with the display screen DS or when the bottom surface 21a is placed opposite to the display screen DS with a slight space therebetween.

As illustrated in FIG. 6, in this embodiment, the casing 21 includes a casing body portion 211 and a securing support portion 212. As illustrated in FIGS. 5A and 6, the casing body portion 211 and the securing support portion 212 are coupled to each other in an axial direction of the casing 21 to form the casing 21. In this case, the casing body portion 211 is coupled to the securing support portion 212 in such a manner as to be capable of rotating about a central axis thereof extending in the axial direction with respect to the securing support portion 212.

As illustrated in FIG. 6, in this embodiment, the securing support portion 212 includes a ring-shaped end surface 212a having a width W (measured in a radial direction of the bottom surface 21a, which is circular) and forming an outer circumferential edge portion of the circular bottom surface 21a of the casing 21, is formed in the shape of a ring, and has an axial dimension of L (i.e., a thickness of L). As illustrated in FIGS. 5B and 6, the magnets 22 are embedded in the ring-shaped end surface 212a of the securing support portion 212.

As illustrated in FIG. 6, the casing body portion 211 includes a shoulder portion 211S that has dimensions matching the thickness L and width W of the securing support portion 212 and that is defined in an outer circumference of the casing 21 near the bottom surface of the casing 21. In addition, the shoulder portion 211S of the casing body portion 211 includes a circumferential side surface 211Sa perpendicular to the bottom surface 21a, and, as illustrated in FIG. 6, a ring-shaped protruding ridge 211p extending all the way around the circumferential side surface 211Sa is defined in the circumferential side surface 211Sa. Meanwhile, the securing support portion 212 includes an inner circumferential surface 212b opposite to the circumferential side surface 211Sa of the shoulder portion 211S of the casing body portion 211, and a ring-shaped recessed groove 212g, into which the ring-shaped protruding ridge 211p is fitted, is defined in the inner circumferential surface 212b at a position corresponding to that of the ring-shaped protruding ridge 211p.

Because of the above-described structures, when the casing body portion 211 and the securing support portion 212 are coupled to each other in the axial direction of the casing 21, the ring-shaped protruding ridge 211p of the circumferential side surface 211Sa of the shoulder portion 211S of the casing body portion 211 is fitted into the ring-shaped recessed groove 212g of the inner circumferential surface 212b of the securing support portion 212, so that the coupling between the casing body portion 211 and the securing support portion 212 is maintained. The dimensions of relevant portions of the securing support portion 212 and the shoulder portion 211S of the casing body portion 211 are determined such that the ring-shaped protruding ridge 211p of the circumferential side surface 211Sa of the shoulder portion 211S of the casing body portion 211 is loosely fitted into the ring-shaped recessed groove 212g of the inner circumferential surface 212b of the securing support portion 212 at this time. Accordingly, the casing body portion 211 is coupled to the securing support portion 212 such that the casing body portion 211 is capable of rotating with respect to the securing support portion 212.

In this case, in the example of FIG. 6, the bottom surface 21a of the casing 21 is made up of a bottom surface 211b of the casing body portion 211 and the ring-shaped end surface 212a of the securing support portion 212, and the bottom surface 211b of the casing body portion 211 and the ring-shaped end surface 212a of the securing support portion 212 are arranged to be flush with each other, but may not necessarily be flush with each other. Note that, to make it easier for the casing body portion 211 to rotate with respect to the securing support portion 212 when the position indicating device 2 is secured to the display screen DS, it is preferable that the ring-shaped end surface 212a of the securing support portion 212 be arranged to protrude slightly outward in the axial direction of the casing 21 relative to the bottom surface 211b of the casing body portion 211 such that a slight gap can be formed between the display screen DS and the bottom surface 211b of the casing body portion 211.

In addition, in the example of FIG. 6, the casing body portion 211 and the securing support portion 212 are flush with each other in a circumferential side surface of the casing 21 as well, but may not necessarily be flush with each other therein. A circumferential side surface of the securing support portion 212 may protrude relative to a circumferential side surface of the casing body portion 211, or conversely, the circumferential side surface of the casing body portion 211 may protrude relative to the circumferential side surface of the securing support portion 212.

As illustrated in FIG. 6, the casing body portion 211 includes a recessed housing portion 211R to house components of the position indicating device 2. The components of the position indicating device 2 include the interaction circuit 3, which interacts and exchanges a signal for indicating a position with the position detection sensor 11 of the information processing apparatus body 10. In this embodiment, the interaction circuit 3 has a structure similar to that of an interaction circuit of an active capacitive electronic pen.

That is, the interaction circuit 3 of the position indicating device 2 according to this embodiment has a structure similar to that of a capacitive electronic pen as the position detection sensor 11 is of the capacitive type. Specifically, as illustrated in FIG. 6, in this example, the interaction circuit 3 includes a central electrode 31 (corresponding to a refill body of an electronic pen) made of an electrically conductive material, e.g., an electrically conductive metal; a peripheral electrode 32 made of an electrically conductive material, e.g., an electrically conductive metal, and disposed in such a manner as to cover a portion of the central electrode 31 in an axial direction of the central electrode 31; and signal processing circuitry 33. The central electrode 31 constitutes a first electrode, and is formed in the shape of a stick in this example. The peripheral electrode 32 constitutes a second electrode, and is formed in the shape of a hollow triangular prismoid in this example.

As illustrated in FIG. 6, in this embodiment, the interaction circuit 3 is installed and immovably supported (an immovably supporting mechanism is not illustrated in the figure) in the recessed housing portion 211R of the casing body portion 211 such that a tip of the stick-shaped central electrode 31 lies at a center of the circular bottom surface 21a of the casing 21 and that the axial direction of the stick-shaped central electrode 31 is inclined at a predetermined angle ($\neq 90$ degrees) with respect to the bottom surface 21a.

As illustrated in FIG. 6, in this embodiment, a bottom of the recessed housing portion 211R of the casing body portion 211 has a relatively small thickness such that the central electrode 31 and the peripheral electrode 32 of the interaction circuit 3 can each interact and exchange signals with the position detection sensor 11 of the information processing apparatus body 10 employing a capacitive method.

As described below, in this embodiment, the position indicating device 2 is configured to indicate a position by sending out a signal to the position detection sensor 11 via the central electrode 31, and to enable the information processing apparatus 1 to detect the direction of an inclination of the central electrode 31 of the interaction circuit 3 with respect to the bottom surface 21a by sending out signals to the position detection sensor 11 via the central electrode 31 and the peripheral electrode 32.

Figure 7A:
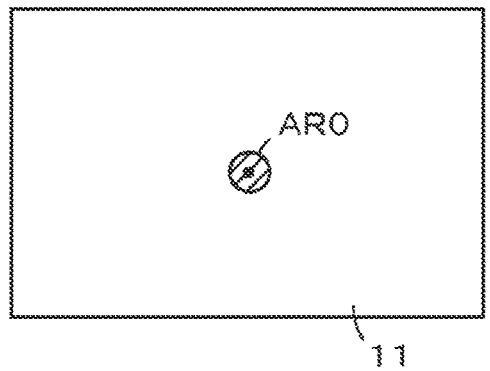
FIGS. 7A and 7B are diagrams for explaining an operation of detecting rotation in the position indicating device of the display system according to an embodiment of this disclosure.

Specifically, in a case where a signal is sent out to the position detection sensor 11 only via the central electrode 31 of the position indicating device 2, in the information processing apparatus 1, the position detection sensor 11 receives the signal from a tip portion of the central electrode 31, thus receiving the signal at a region AR0 as indicated by hatched lines in FIG. 7A, and the position detection circuit 104 detects, on the basis thereof, a position indicated by the tip portion of the central electrode 31. Then, the position detection circuit 104 supplies information as to the detected position indicated by the tip portion of the central electrode 31 to the control circuit 101.

Figure 7B:
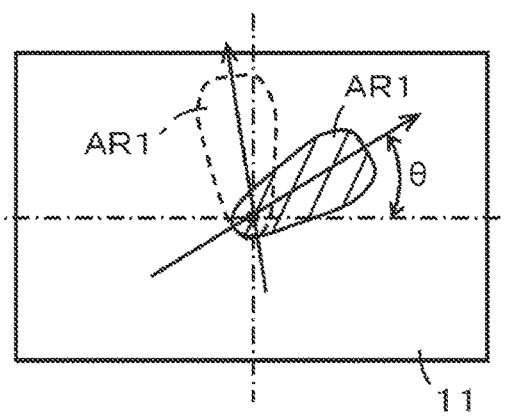

Meanwhile, in a case where signals are sent out to the position detection sensor 11 via both the central electrode 31 and the peripheral electrode 32 of the position indicating device 2, in the information processing apparatus 1, the position detection sensor 11 receives the signals from the inclined central electrode 31 and the peripheral electrode 32, thus receiving the signals at an oblong region AR1 as indicated by hatched lines in FIG. 7B, the oblong region AR1 having a longitudinal direction corresponding to the direction of the inclination of the central electrode 31 with respect to the bottom surface 21a. Then, the position detection circuit 104 detects the direction of an inclination of the interaction circuit 3 (i.e., the direction of the inclination of the central electrode 31 of the interaction circuit 3) (a direction indicated by an arrow in FIG. 7B) by detecting the longitudinal direction of the oblong region AR1, and supplies information as to the orientation of the longitudinal direction to the control circuit 101. Thus, the position detection circuit 104 supplies information as to the detected direction of the inclination of the interaction circuit 3 to the control circuit 101.

If the casing body portion 211 is rotated, the direction of the inclination of the interaction device 3 changes, resulting in, for example, a change from the oblong region AR1 to an oblong region AR1' as illustrated in FIG. 7B. The control circuit 101 detects a change in the orientation of the longitudinal direction of the oblong region AR1, thereby detecting the direction and amount of the rotation of the casing body portion 211.

As illustrated in FIGS. 5A, 5B, and 6, in this embodiment, a mouth portion of the recessed housing portion 211R of the casing body portion 211 lies at the upper surface of the casing 21 on the side opposite to the bottom surface 21a in the axial direction of the casing 21, and the push button 23 is disposed at the mouth portion. As illustrated in FIG. 6, the push button 23 is elastically supported by a coil spring 4 disposed in the recessed housing portion 211R of the casing body portion 211.

The push button 23 includes an open/close switch 23S that is turned on or off in response to an operation of pressing the push button 23. In this embodiment, if the push button 23 is pressed inward into the recessed housing portion 211R of the casing body portion 211 against elastic force of the coil spring 4, the push button 23 is locked in a state of being depressed, causing the open/close switch 23S to enter an ON state. If the push button 23 in this locked state is further pressed, the lock is released, allowing the elastic force of the coil spring 4 to return the push button 23 into an original protruding state, and returning the open/close switch 23S into an OFF state. A mechanism for movement of the push button 23 and a mechanism for turning on or off the open/close switch 23S are not illustrated in FIG. 6 because well-known mechanisms can be adopted as such.

In addition, in this embodiment, in the recessed housing portion 211R of the casing body portion 211, electrical components of the position indicating device 2 are, for example, arranged on a printed circuit board disposed, for example, on the bottom of the recessed housing portion 211R.

Figure 8:
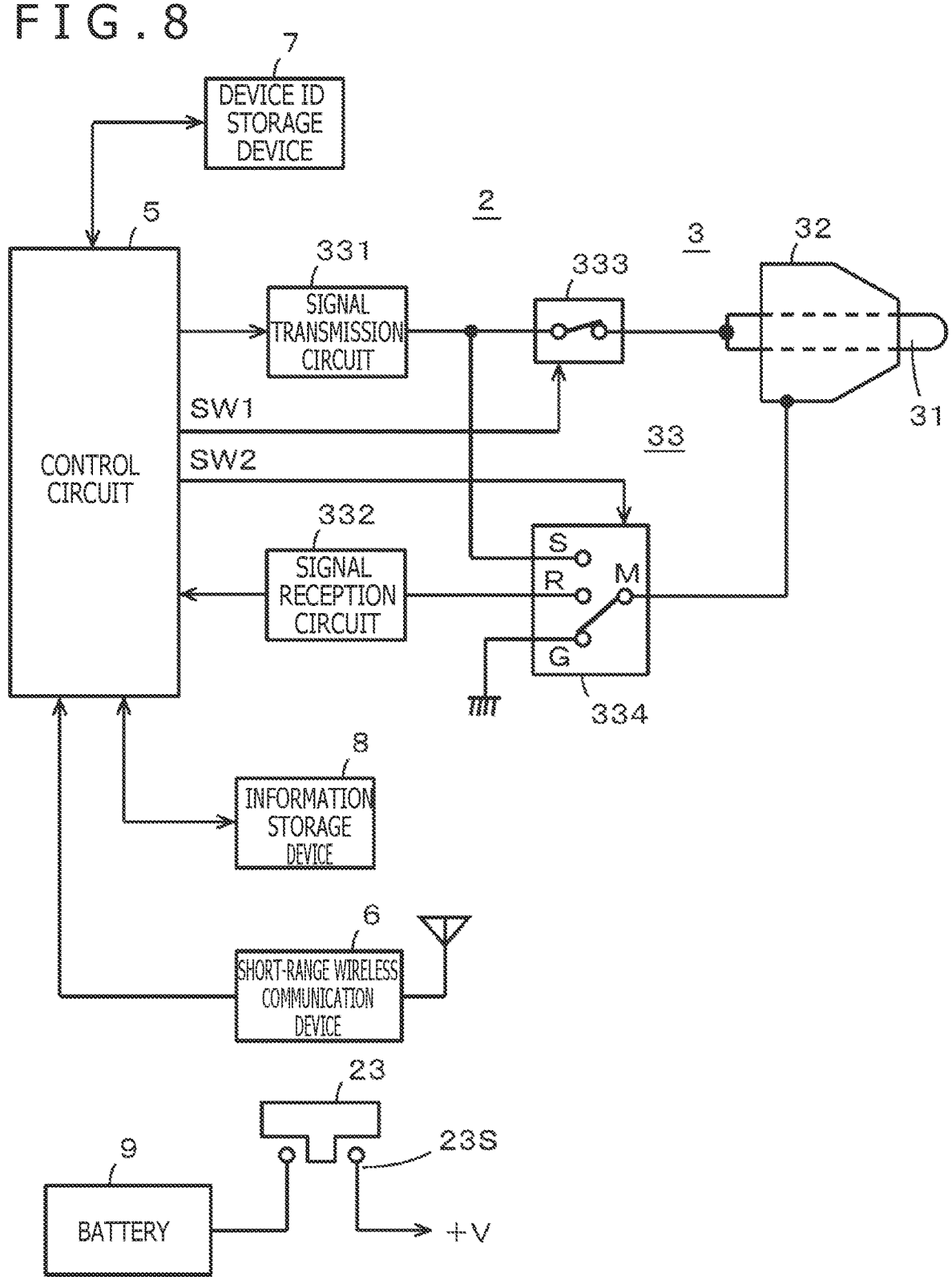
FIG. 8 is a block diagram for explaining an example electrical configuration of the position indicating device of the display system according to an embodiment of this disclosure.

FIG. 8 is a diagram for explaining an example electrical configuration of an interior of the position indicating device 2 according to this embodiment. As illustrated in FIG. 8, the interaction circuit 3 and a control circuit 5 are disposed in the recessed housing portion 211R of the position indicating device 2. In one or more implementations, the control circuit 5 includes a processor and a memory storing process-readable instructions that, when executed by the processor, cause the control circuit 5 to perform the functions described herein. The control circuit 5 controls the interaction and signal exchange with the position detection sensor 11 via the interaction circuit 3, and also controls the whole of the position indicating device 2. Moreover, in the recessed housing portion 211R of the casing body portion 211 of the position indicating device 2, a short-range wireless communication device 6, a device ID storage device 7, and an information storage device 8 are disposed, and are each connected to the control circuit 5. The short-range wireless communication device 6 communicates with the short-range wireless communication device 108 of the information processing apparatus body 10. The device ID storage device 7 stores the unique identification information (i.e., the device ID) of the position indicating device 2. The information storage device 8 is used to store various types of information.

In addition, as illustrated in FIG. 8, a battery 9 is disposed in the recessed housing portion 211R of the casing body portion 211 of the position indicating device 2, and a power supply voltage is supplied from the battery 9 to the control circuit 5 and other circuit portions through the open/close switch 23S formed by the push button 23. Accordingly, when the open/close switch 23S is in the OFF state, the power supply voltage is not supplied to any of the circuit portions of the position indicating device 2, making the position indicating device 2 inactive, and when the open/close switch 23S is turned on, the power supply voltage is supplied to the circuit portions of the position indicating device 2, causing the position indicating device 2 to start operating.

As illustrated in FIG. 8, in this example, in the signal processing circuitry 33 of the interaction circuit 3, a signal transmission circuit 331 and a signal reception circuit 332 are connected to the control circuit 5. A signal output terminal of the signal transmission circuit 331 is connected to the central electrode 31 through a switch circuit 333. In addition, in this example, the signal output terminal of the signal transmission circuit 331 is connected to a terminal S of a change switch circuit 334. A movable terminal M of the change switch circuit 334 is connected to the peripheral electrode 32. A terminal R of the change switch circuit 334 is connected to an input terminal of the signal reception circuit 332. In addition, a terminal G of the change switch circuit 334 is connected to an earth electrode (ground electrode).

The control circuit 5 supplies a switch control signal SW1 for on-off control of the switch circuit 333 to the switch circuit 333. In addition, the control circuit 5 supplies, to the change switch circuit 334, a switch control signal SW2 for making a switch in the terminal, i.e., the terminal S, the terminal R, or the terminal G, to which the movable terminal M is connected.

The signal reception circuit 332 monitors whether or not a signal has been received from the position detection sensor 11 via the peripheral electrode 32 when the terminal R is selected in the change switch circuit 334. When the signal reception circuit 332 has detected reception of a signal from the position detection sensor 11 via the peripheral electrode 32, the signal reception circuit 332 performs a demodulation process or the like that matches the received signal, and sends a resulting signal obtained by the process to the control circuit 5.

The signal transmission circuit 331 outputs, as a signal to be sent out via the central electrode 31, a signal including a position detection signal (i.e., a burst signal) having a predetermined frequency for position detection in the position detection circuit 104 of the information processing apparatus 1 and the device ID as additional information. In addition, the signal transmission circuit 331 outputs, as a signal to be sent out via the peripheral electrode 32, a signal for detection of the direction of the inclination of the interaction circuit 3.

Under control of the control circuit 5, the signal transmission circuit 331 generates and sends out the signal to be sent out via the central electrode 31 or the signal to be sent out via the peripheral electrode 32. In addition, the control circuit 5 converts the device ID read from the device ID storage device 7 to a digital signal having a plurality of bits in this example, and controls the signal transmission circuit 331 such that the digital signal is outputted from the signal transmission circuit 331 immediately after the position detection signal.

The information storage device 8 stores information received from the position detection sensor 11 of the information processing apparatus 1 via the peripheral electrode 32 or information received from the short-range wireless communication device 108 of the information processing apparatus 1 via the short-range wireless communication device 6, on the basis of control by the control circuit 5. The information stored in the information storage device 8 is read therefrom and, in this embodiment, is sent out via the short-range wireless communication device 6 on the basis of control by the control circuit 5.

As suggested above, in this example, a wireless communication device compliant with the Bluetooth (registered trademark) standard is used as the short-range wireless communication device 6 to communicate with the short-range wireless communication device 108 of the information processing apparatus 1 in a wireless manner. Note that, needless to say, the short-range wireless communication device 6 is capable of wireless communication not only with the information processing apparatus 1 but also with a personal computer and so on in which a wireless communication device compliant with the Bluetooth (registered trademark) standard is used.

An operation of the interaction circuit 3 of the position indicating device 2 according to this embodiment will now be described below with reference to FIGS. 9A to 9E.

Figure 9:
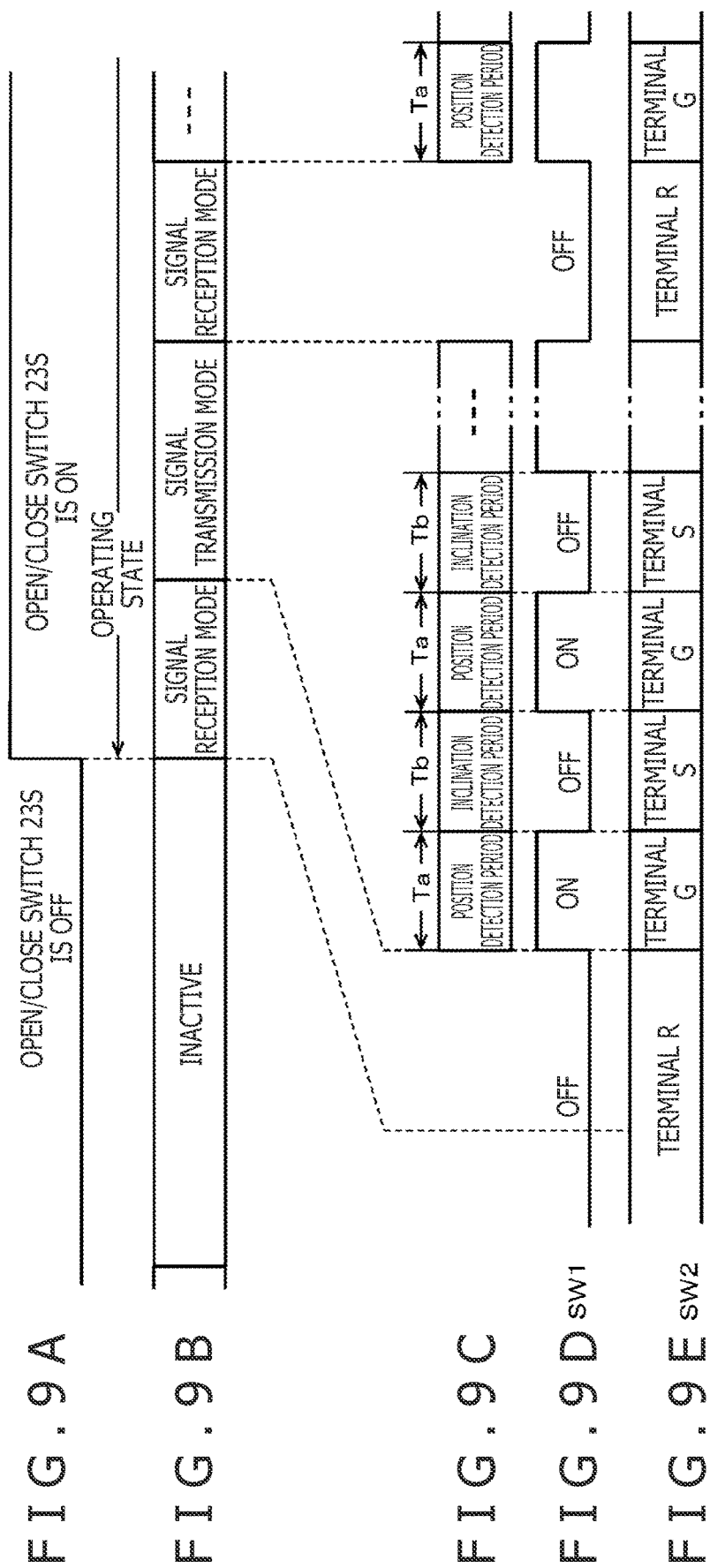
FIGS. 9A to 9E represent a timing diagram for explaining an operation of the position indicating device of the display system according to an embodiment of this disclosure.

With reference to FIGS. 9A and 9B, the position indicating device 2 according to this embodiment is in an inactive state when the push button 23 is not in the depressed state, and the open/close switch 23S is thus in the OFF state, and when the push button 23 is depressed and locked, the open/close switch 23S enters the ON state, causing the power supply voltage to be supplied from the battery 9 to various portions, resulting in an operating state of the position indicating device 2.

With reference to FIG. 9B, when the position indicating device 2 is in the operating state, the control circuit 5 performs control of switching an operation mode of the interaction circuit 3 between a signal reception mode and a signal transmission mode in a time-division manner. This time-division control is arranged to start with the signal reception mode.

With reference to FIG. 9E, in the signal reception mode, the control circuit 5 causes the fixed terminal R to be selected in the change switch circuit 334 by using the switch control signal SW2. Accordingly, the signal reception circuit 332 receives a signal that the peripheral electrode 32 has received from the position detection sensor 11, through the change switch circuit 334, performs the demodulation process or the like that matches the received signal, and sends a resulting signal obtained by the process to the control circuit 5. In addition, with reference to FIG. 9D, in the signal reception mode, the control circuit 5 causes the switch circuit 333 to be in the OFF state by using the switch control signal SW1 not to send out a signal via the central electrode 31. Note that, alternatively, not only the peripheral electrode 32 but also the central electrode 31 may be used for signal reception in the signal reception mode.

The control circuit 5 analyzes the signal received from the position detection sensor 11, by using the signal obtained from the signal reception circuit 332, and determines timings at which interaction and signal exchange with the associated position detection sensor 11 are to be performed, on the basis of a result of the analysis. Then, the control circuit 5 performs control to cause signals that are to be sent out from the signal transmission circuit 331 in the signal transmission mode to be sent out at the determined timings.

In addition, in the signal reception mode, if the control circuit 5 receives, from the signal reception circuit 332, information sent from the information processing apparatus 1 through the position detection sensor 11 and the peripheral electrode 32, the control circuit 5 performs a process of storing the received information in the information storage device 8 as well.

Then, in this embodiment, in the signal transmission mode, the control circuit 5 executes a position detection period Ta and an inclination detection period Tb a plurality of times in a time-division manner (see FIG. 9C). Here, in the position detection period Ta, the burst signal for position detection and the device ID are sent out to the position detection sensor 11, while the inclination detection period Tb is provided for detection of an angle of inclination of the interaction circuit 3 of the position indicating device 2.

In the position detection period Ta, the control circuit 5 causes the switch circuit 333 to be in the ON state by using the switch control signal SW1 (see FIG. 9D), and, by using the switch control signal SW2 (see FIG. 9E), causes the movable terminal M to be connected to the fixed terminal G in the change switch circuit 334. Accordingly, the peripheral electrode 32 is connected to an earth terminal.

Then, in the position detection period Ta, the control circuit 5 controls the signal transmission circuit 331 to supply the signal including the device ID and the position detection signal (i.e., the burst signal) having the predetermined frequency for position detection in the position detection circuit 104 to the central electrode 31 through the switch circuit 333 to transmit this signal to the position detection sensor 11 through capacitive coupling. At this time, the peripheral electrode 32, which is connected to the earth terminal, functions as a shield electrode for the central electrode 31 to prevent noise from being introduced into the central electrode 31.

In the inclination detection period Tb, the control circuit 5 causes the switch circuit 333 to be in the OFF state by using the switch control signal SW1 (see FIG. 9D), and, by using the switch control signal SW2 (see FIG. 9E), causes the movable terminal M to be connected to the fixed terminal S in the change switch circuit 334. Then, in the inclination detection period Tb, the control circuit 5 performs control to cause a burst signal for detection of an angle of inclination of the central electrode 31 of the interaction circuit 3 to be generated from the signal transmission circuit 331 to send out the burst signal via the peripheral electrode 32.

Example Functional Structures of Information Processing Apparatus 1 and Position Indicating Device 2 in Display System When, in the display system having the above-described structure, the position indicating device 2 is placed on the display screen DS of the information processing apparatus 1 with the bottom surface 21a facing the display screen DS as illustrated in FIG. 1, the position indicating device 2 is secured to, as if being stuck to, the display screen DS through magnetic attraction force between the magnets 22 and the magnetic plate 13 of the information processing apparatus body 10. Then, if a user depresses the push button 23 of the position indicating device 2, causing the push button 23 to be locked in the depressed state, the position indicating device 2 starts operating, becoming able to interact with the position detection sensor 11 of the information processing apparatus 1.

Then, the information processing apparatus 1 receives, from the central electrode 31 via the position detection sensor 11, the signal sent in the position detection period Ta of the signal transmission mode of the interaction circuit 3 of the position indicating device 2, and the position detection circuit 104 detects the device ID as well as the position indicated by the tip portion of the central electrode 31, and supplies the results of the detection to the control circuit 101. The control circuit 101 grasps the position indicated by the tip of the central electrode 31 of the interaction circuit 3 of the position indicating device 2 and detected by the position detection circuit 104, and also grasps an application stored in such a manner as to be associated with the device ID.

Then, as illustrated in FIG. 1, the control circuit 101 displays a window WD (i.e., an initial window) for the grasped application on the display screen DS with the grasped indicated position used as a reference. In this example, as illustrated in FIG. 10, the control circuit 101 of the information processing apparatus 1 causes the window WD to be displayed such that the position on the display screen DS indicated by the position indicating device 2 lies in the vicinity of one of four corners of the window WD, which is rectangular and has a specific size.

Figure 10:
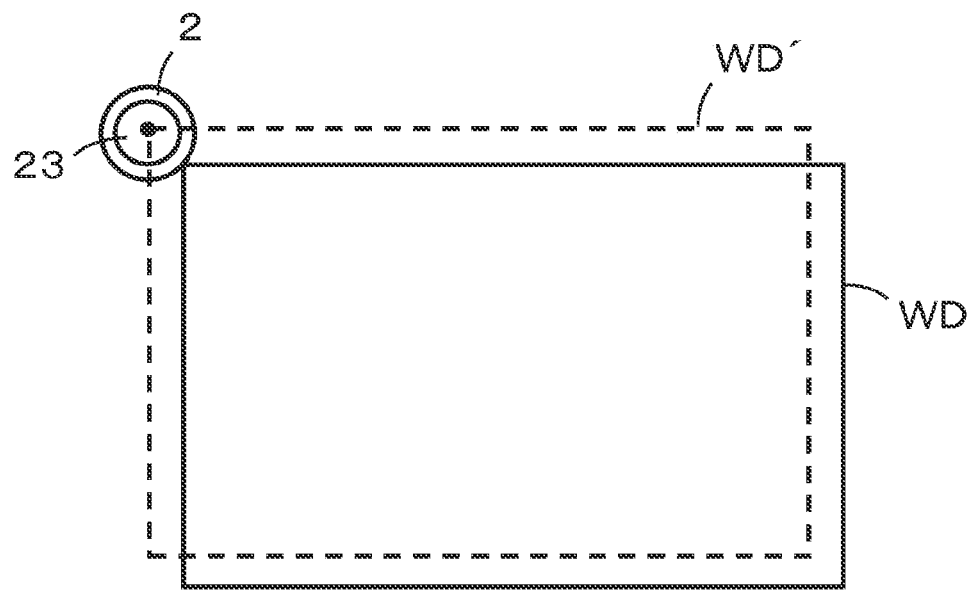
FIG. 10 is a diagram for explaining an example operation of the information processing apparatus of the display system according to an embodiment of this disclosure.

In this case, if the window WD is displayed such that the position on the display screen DS indicated by the position indicating device 2 lies in the vicinity of one of the four corners of the rectangular window WD, for example, always lies in the vicinity of a top left corner of the rectangular window WD as illustrated in FIG. 10, the window WD, having the specific size, may be displayed with a portion thereof missing, depending on the position on the display screen DS indicated by the position indicating device 2.

Figure 11:
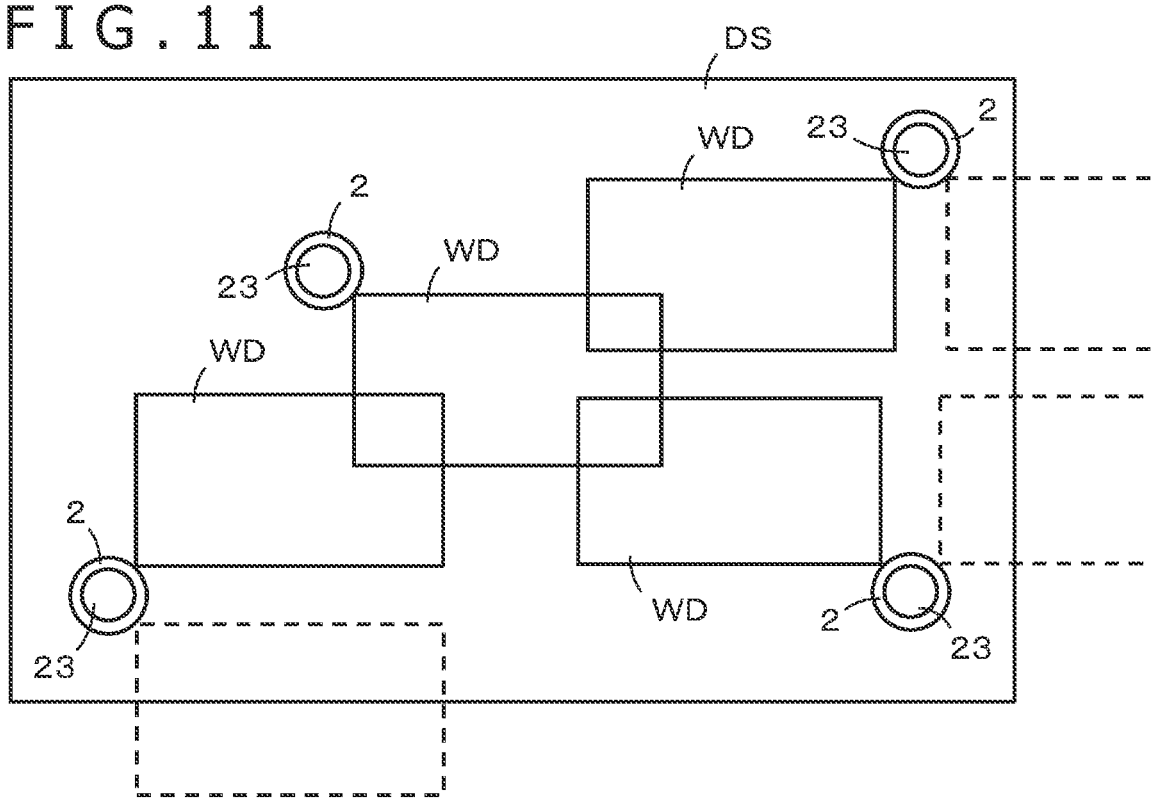
FIG. 11 is a diagram for explaining example operations of the information processing apparatus of the display system according to an embodiment of this disclosure.

Specifically, with reference to FIG. 11, in a case where the position indicating device 2 is placed on a substantially central region of the display screen DS or on an upper left region of the display screen DS, the window WD, having the specific size, can be entirely displayed when the position on the display screen DS indicated by the position indicating device 2 is arranged to lie in the vicinity of the top left corner of the window WD. However, with reference to FIG. 11, in a case where the position indicating device 2 is placed on a lower left region, an upper right region, or a lower right region of the display screen DS, the window WD, having the specific size, may be displayed with a portion thereof missing as represented by dashed lines in FIG. 11, when the position on the display screen DS indicated by the position indicating device 2 is arranged to lie in the vicinity of the top left corner of the window WD.

In view of this problem, in this embodiment, the information processing apparatus 1 is configured to detect the position on the display screen DS indicated by the position indicating device 2, when the position indicating device 2 has been placed on the display screen DS, and determine how the window WD is to be displayed, according to the detected position. Specifically, in the case of the example described above, the information processing apparatus 1 is configured to select one of the four corners of the window WD as the position in the vicinity of which the position indicated by the position indicating device 2 is to lie when the window WD is displayed.

Thus, in a case where the position indicating device 2 has been placed on the lower left region of the display screen DS, the position on the display screen DS indicated by the position indicating device 2 is determined to lie in the vicinity of a bottom left corner of the window WD, and as a result, the window WD, having the specific size, is entirely displayed as represented by a solid line in FIG. 11. In addition, in a case where the position indicating device 2 has been placed on the upper right region of the display screen DS, the position on the display screen DS indicated by the position indicating device 2 is determined to lie in the vicinity of a top right corner of the window WD, and as a result, the window WD, having the specific size, is entirely displayed as represented by a solid line in FIG. 11. Further, in a case where the position indicating device 2 has been placed on the lower right region of the display screen DS, the position on the display screen DS indicated by the position indicating device 2 is determined to lie in the vicinity of a bottom right corner of the window WD, and as a result, the window WD, having the specific size, is entirely displayed as represented by a solid line in FIG. 11.

Note that, in this case, since the tip of the central electrode 31 of the interaction circuit 3 of the position indicating device 2 is positioned at the center of the bottom surface 21a of the position indicating device 2 as described above, the position indicated by the position indicating device 2 and detected by the position detection circuit 104 is the position of the center of the bottom surface 21a of the position indicating device 2. The position indicating device 2 has specific dimensions, and therefore, if the window WD is displayed with the position of the center of the bottom surface 21a of the position indicating device 2 detected by the position detection circuit 104 used as a reference, a portion of the window WD will be hidden behind the bottom surface 21a of the position indicating device 2 as represented by a dashed line in FIG. 10. To avoid this phenomenon, in this embodiment, the information processing apparatus 1 performs control to display the window WD such that one of the four corners of the window WD coincides with a reference position that is away from the detected position by a radius of the bottom surface 21a of the position indicating device 2.

In each of the examples of FIG. 11, the information processing apparatus 1 displays the window WD such that the position on the display screen DS indicated by the position indicating device 2 lies at one of the four corners of the rectangular window WD. Note, however, that the relations between the window WD and the position on the display screen DS indicated by the position indicating device 2 are not limited to those of the examples of FIG. 11, and that any desirable positional relation may be set in advance as the positional relation therebetween.

For example, in each of examples of FIGS. 12A, 12B, 12C, and 12D, the window WD is displayed such that the position indicated by the position indicating device 2 lies at an intermediate position, in particular, at an exact middle position, along one of four sides of the rectangular window WD. Specifically, in the example of FIG. 12A, the information processing apparatus 1 displays the window WD such that the position indicated by the position indicating device 2 lies at the middle position along an upper side of the rectangular window WD. In addition, in the example of FIG. 12B, the information processing apparatus 1 displays the window WD such that the position indicated by the position indicating device 2 lies at the middle position along a lower side of the rectangular window WD. Further, in the example of FIG. 12C, the information processing apparatus 1 displays the window WD such that the position indicated by the position indicating device 2 lies at the middle position along a left side of the rectangular window WD. Still further, in the example of FIG. 12D, the information processing apparatus 1 displays the window WD such that the position indicated by the position indicating device 2 lies at the middle position along a right side of the rectangular window WD.

As described above, the information processing apparatus 1 is able to cause the window WD, having the specific size, to be always entirely displayed on the display screen DS, by performing control of determining in which directions the rectangular window WD to be displayed is to extend from the reference position with the position on the display screen DS indicated by the position indicating device 2 used as a reference.

Note that, although it has been assumed in the foregoing description that the window WD is initially displayed in the specific size determined in advance, the size (vertical and/or horizontal dimensions) of the window WD may be controlled according to the position on the display screen DS indicated by the position indicating device 2 and detected by the information processing apparatus 1. Also note that, in the information processing apparatus 1, different sizes of the window WD may be selected in advance for different applications each associated with the device ID of a separate one of the position indicating devices 2.

If the user moves the position indicating device 2 along the display screen DS when the interaction between the position indicating device 2 and the position detection sensor 11 of the information processing apparatus 1 is maintained after the window WD is displayed in the above-described manner, the size of the window WD is changed according to the direction in which the position indicating device 2 is moved, with the display position of the window WD remaining unchanged.

Figure 13A:
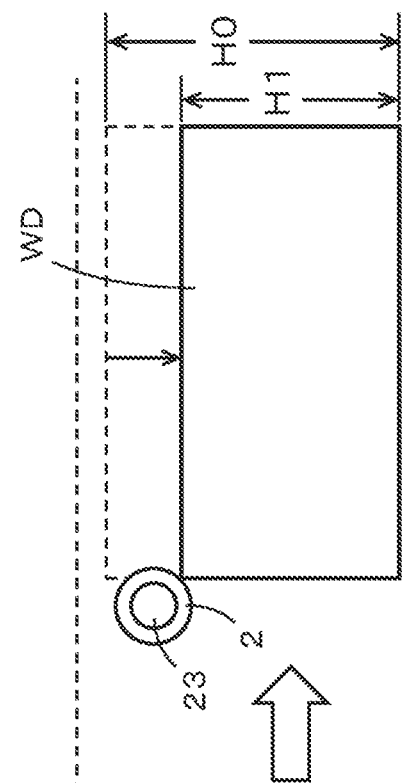
FIGS. 13A to 13D depict a diagram for explaining example operations of the information processing apparatus of the display system according to an embodiment of this disclosure.

Examples in which the size of the window WD is changed according to the movement of the position indicating device 2 along the display screen DS will now be described below with reference to FIGS. 13A to 13D. It is assumed here that a window WD having a horizontal width of L0 and a vertical dimension of H0 has been displayed with the position on the display screen DS indicated by the position indicating device 2 lying in the vicinity of the top left corner of the window WD as illustrated in FIG. 13A, for example.

Figure 13B:
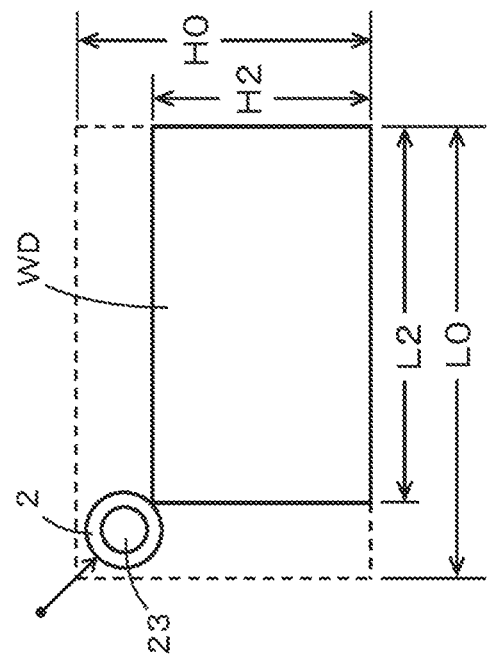

With reference to FIG. 13B, if the user moves the position indicating device 2 vertically downward, the upper side of the window WD is shifted downward by the same distance by which the position indicating device 2 has been moved, with the horizontal width L0 of the window WD remaining unchanged and the position of the lower side of the window WD remaining unchanged, the lower side being opposite to the upper side, at which the position indicating device 2 lies, in the direction in which the position indicating device 2 has been moved. As a result, the vertical dimension of the window WD is reduced from H0 to H1 (<H0), resulting in a change in the size, i.e., a reduction in the vertical dimension, of the window WD. Meanwhile, although not illustrated in the figure, if the user moves the position indicating device 2 vertically upward, the upper side of the window WD is shifted upward by the same distance by which the position indicating device 2 has been moved, with the horizontal width L0 of the window WD remaining unchanged and the position of the lower side of the window WD remaining unchanged. This results in a change in the size, i.e., an increase in the vertical dimension, of the window WD.

Figure 13C:
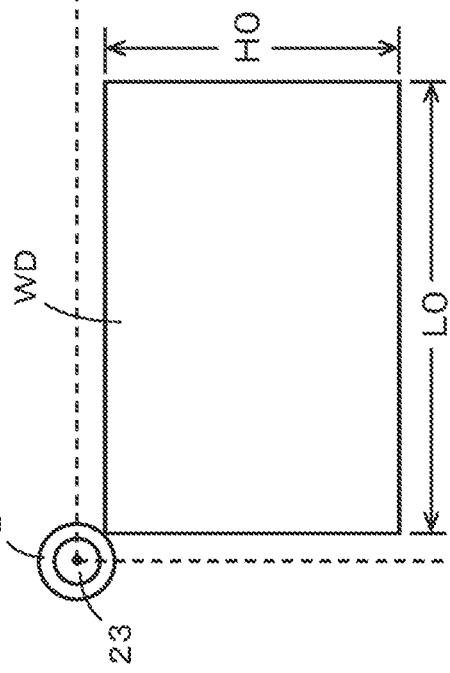

Meanwhile, with reference to FIG. 13C, if the user moves the position indicating device 2 horizontally to the right, the left side of the window WD is shifted horizontally by the same distance by which the position indicating device 2 has been moved, with the vertical dimension of the window WD remaining unchanged from H0 and the position of the right side of the window WD remaining unchanged, the right side being opposite to the left side, at which the position indicating device 2 lies, in the direction in which the position indicating device 2 has been moved. As a result, the horizontal width of the window WD is reduced from L0 to L1 (<L0), resulting in a change in the size, i.e., a reduction in the horizontal dimension, of the window WD. Meanwhile, although not illustrated in the figure, if the user conversely moves the position indicating device 2 to the left, the left side of the window WD is shifted to the left by the same distance by which the position indicating device 2 has been moved, with the vertical dimension of the window WD remaining unchanged from H0 and the position of the right side of the window WD remaining unchanged. As a result, the horizontal width of the window WD is increased from L0, resulting in a change in the size, i.e., an increase in the horizontal dimension, of the window WD.

Figure 13D:
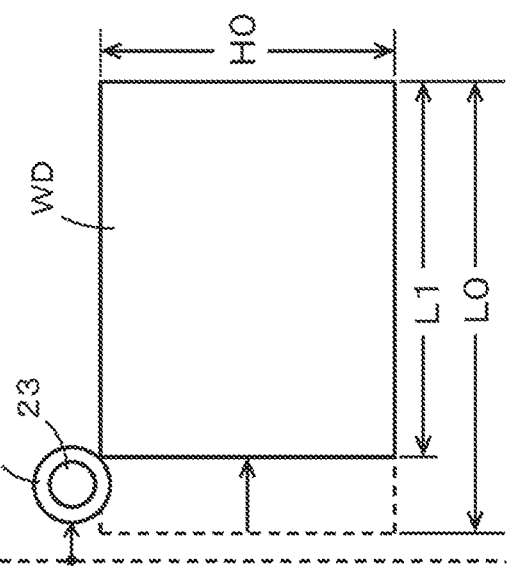

In addition, with reference to FIG. 13D, if the user moves the position indicating device 2 obliquely downward and to the right and the top left corner of the window WD is moved accordingly, the left side and the upper side of the window WD are shifted to the right and downward, respectively, according to the movement of the position indicating device 2, with the position of each of the right side and the lower side of the window WD, to which the bottom right corner of the window WD belongs, remaining unchanged, the bottom right corner being opposite to the top left corner in the direction in which the position indicating device 2 has been moved. As a result, the horizontal width of the window WD is reduced from L0 to L2 (<L0), and the vertical dimension of the window WD is reduced from H0 to H2 (<H0), resulting in a change in the size, i.e., reductions in the horizontal width and vertical dimension, of the window WD. Meanwhile, although not illustrated in the figure, if the user conversely moves the position indicating device 2 obliquely upward and to the left and the top left corner of the window WD is moved accordingly, the left side and the upper side of the window WD are shifted to the left in a direction away from the right side of the window WD and upward in a direction away from the lower side of the window WD, respectively, according to the movement of the position indicating device 2, with the position of each of the right side and the lower side, to which the bottom right corner belongs, remaining unchanged. As a result, the horizontal width of the window WD is increased from L0, and the vertical dimension of the window WD is increased from H0, resulting in a change in the size, i.e., increases in the horizontal and vertical dimensions, of the window WD.

In the case of the example of FIG. 13D, a convenience is provided in that the horizontal and vertical dimensions of the window WD can be changed as desired by changing the position of the top left corner, corresponding to the position indicated by the position indicating device 2, of the window WD with the position of the bottom right corner of the window WD fixed.

In addition, in this embodiment, as described above, if the casing body portion 211 of the position indicating device 2 is rotated with respect to the securing support portion 212, the position detection circuit 104 of the information processing apparatus 1 is able to detect the direction and amount (i.e., rotation angle) of the rotation.

The information processing apparatus 1 is configured to be capable of changing the size of the window WD according to the direction and amount of the rotation of the position indicating device 2 as well.

Examples in which the size of the window WD is changed according to the rotation of the casing body portion 211 in the position indicating device 2 will now be described below with reference to FIGS. 14A to 14C. It is assumed here that a window WD having a horizontal width of L0 and a vertical dimension of H0 has been displayed with the position on the display screen DS indicated by the position indicating device 2 lying in the vicinity of the top left corner of the window WD as illustrated in FIG. 14A, for example.

In this embodiment, the information processing apparatus 1 is configured to enlarge the window WD as illustrated in FIG. 14B when the detected rotation direction is, for example, a clockwise direction, and to shrink the window WD as illustrated in FIG. 14C when the detected rotation direction is a counterclockwise direction, without changing the aspect ratio of the window WD. In addition, the information processing apparatus 1 is configured to change the size of the window WD at an enlargement/shrinkage ratio corresponding to the detected rotation amount.

In this case, with reference to FIG. 14B, L0:H0=L3:H3, where L3 and H3 denote the horizontal width and the vertical dimension, respectively, of the window WD enlarged after the casing body portion 211 of the position indicating device 2 is rotated in the clockwise direction. In addition, with reference to FIG. 14C, L0:H0=L4:H4, where L4 and H4 denote the horizontal width and the vertical dimension, respectively, of the window WD shrunk after the casing body portion 211 of the position indicating device 2 is rotated in the counterclockwise direction.

If the information processing apparatus 1 accepts an input operation performed onto the window WD opened in the above-described manner using the mouse 1M, the keyboard 1K, or the electronic pen 1P, the information processing apparatus 1 changes a content displayed within the window WD, according to the input operation or input information, and, if a storage instruction is issued, causes information with respect to which the storage instruction has been issued to be stored in the storage device 107.

Then, the information processing apparatus 1 transmits information associated with the window WD, such as information inputted via the open window WD, or information acquired via the Internet in relation to the window WD, to the position indicating device 2 via the position detection sensor 11 as necessary. Note that the information processing apparatus 1 may alternatively transmit the information associated with the window WD to the position indicating device 2 not via the position detection sensor 11 but via the short-range wireless communication device 108.

In addition, the information processing apparatus 1 is configured to inquire of the position indicating device 2 whether or not there is information to be acquired therefrom as information related to a process on the window WD, and, if there is such information, receive the information from the position indicating device 2 via the short-range wireless communication device 108, and use the information in the process on the window WD as necessary. Note that the information processing apparatus 1 may alternatively be configured to receive the information from the position indicating device 2 via the position detection sensor 11.

Note that the position indicating device 2 may receive and acquire the information to be transmitted to the information processing apparatus 1, from a personal computer via the short-range wireless communication device 6, and store the information in the information storage device 8. In this case, the user may cause the personal computer to acquire this information in advance from, for example, the Internet, a universal serial bus (USB) memory stick, or a card-type memory, and thereafter cause the acquired information to be transmitted to the position indicating device 2 through wireless connection between a short-range wireless communication device of the personal computer and the short-range wireless communication device 6 of the position indicating device 2.

Example Operation of Information Processing Apparatus 1

Figure 15:
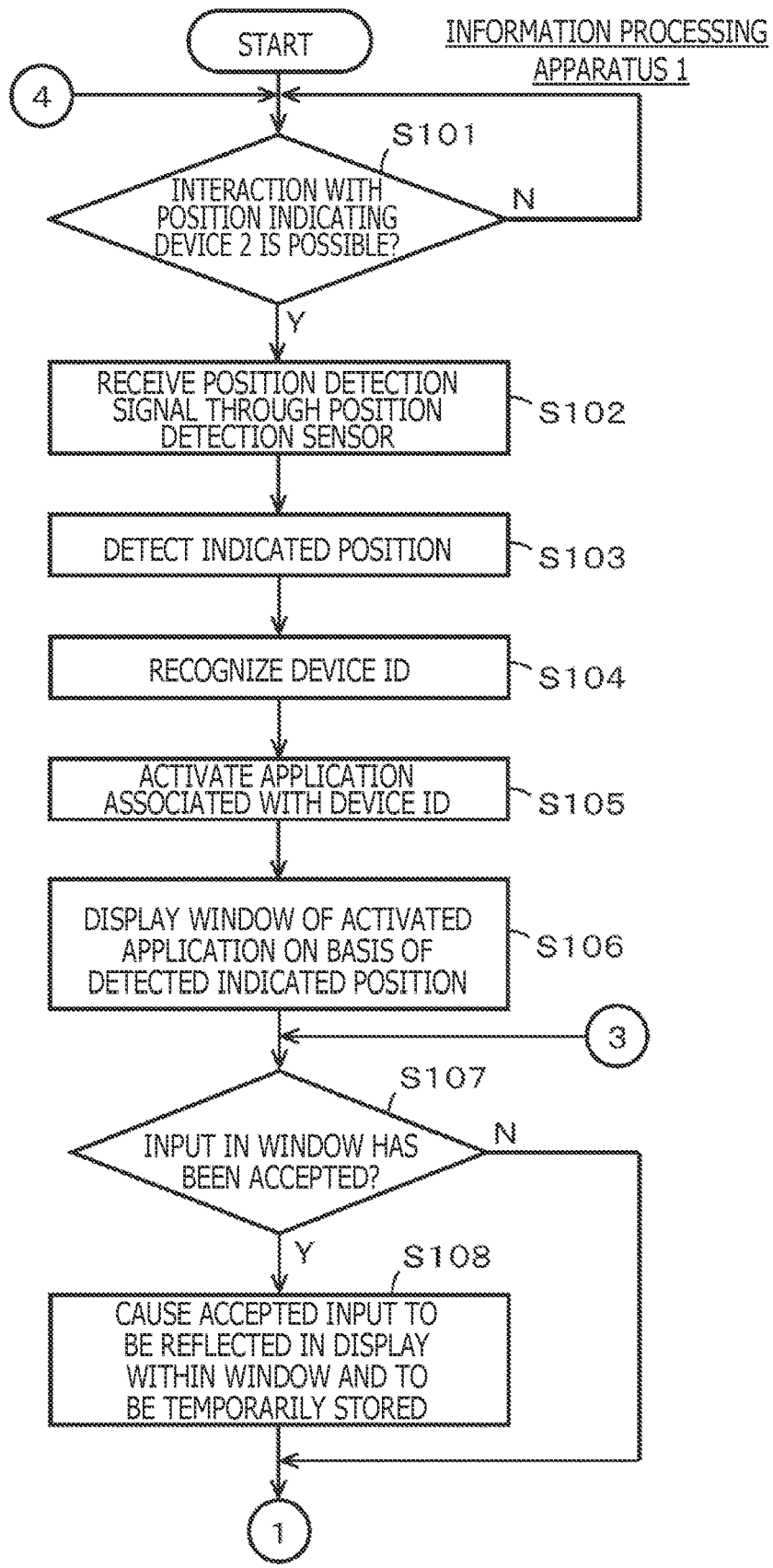
FIG. 15 represents a portion of a flowchart for explaining an example flow of an operation of the information processing apparatus of the display system according to an embodiment of this disclosure.
Figure 16:
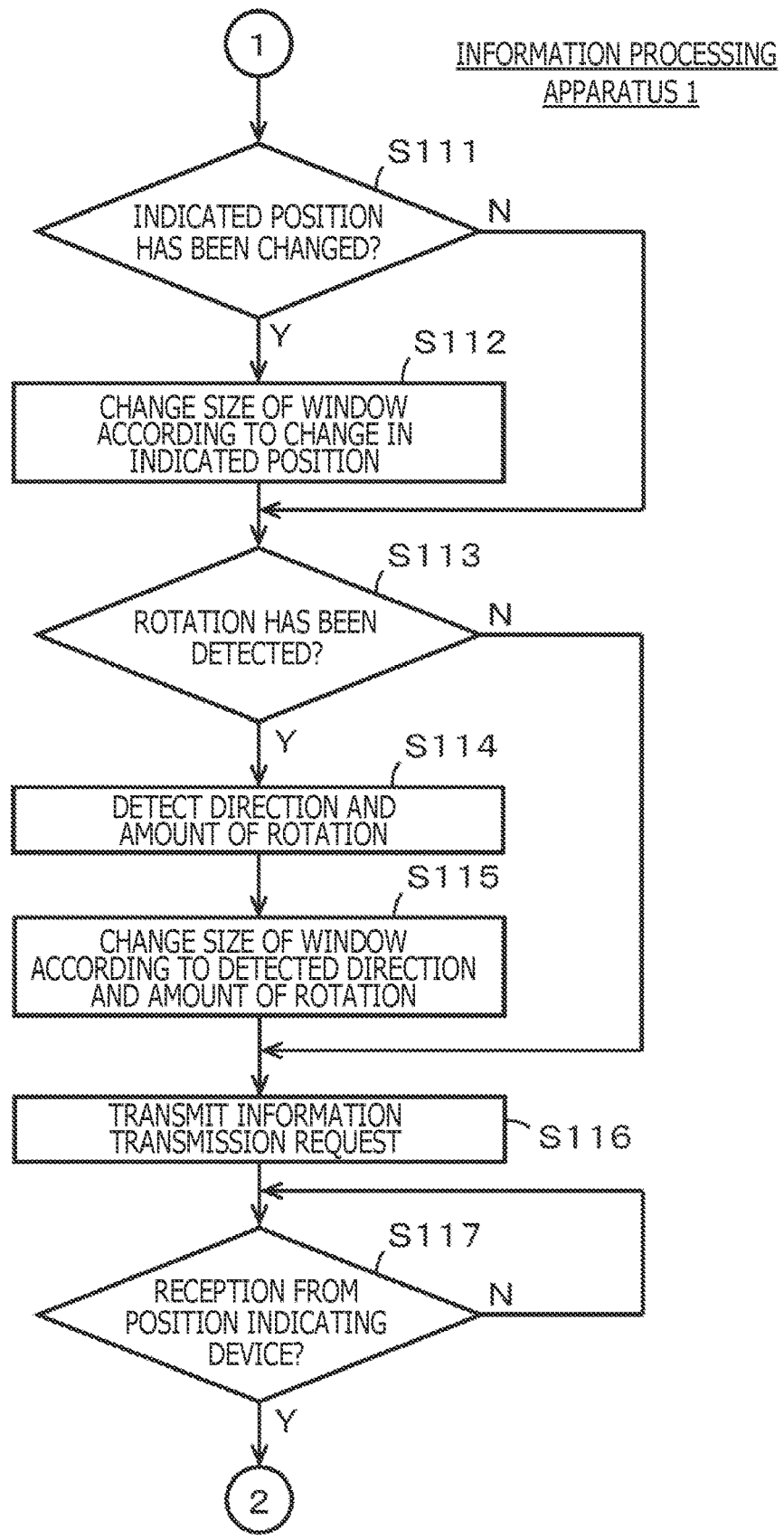
FIG. 16 represents a portion of the flowchart for explaining the example flow of the operation of the information processing apparatus of the display system according to an embodiment of this disclosure.
Figure 17:
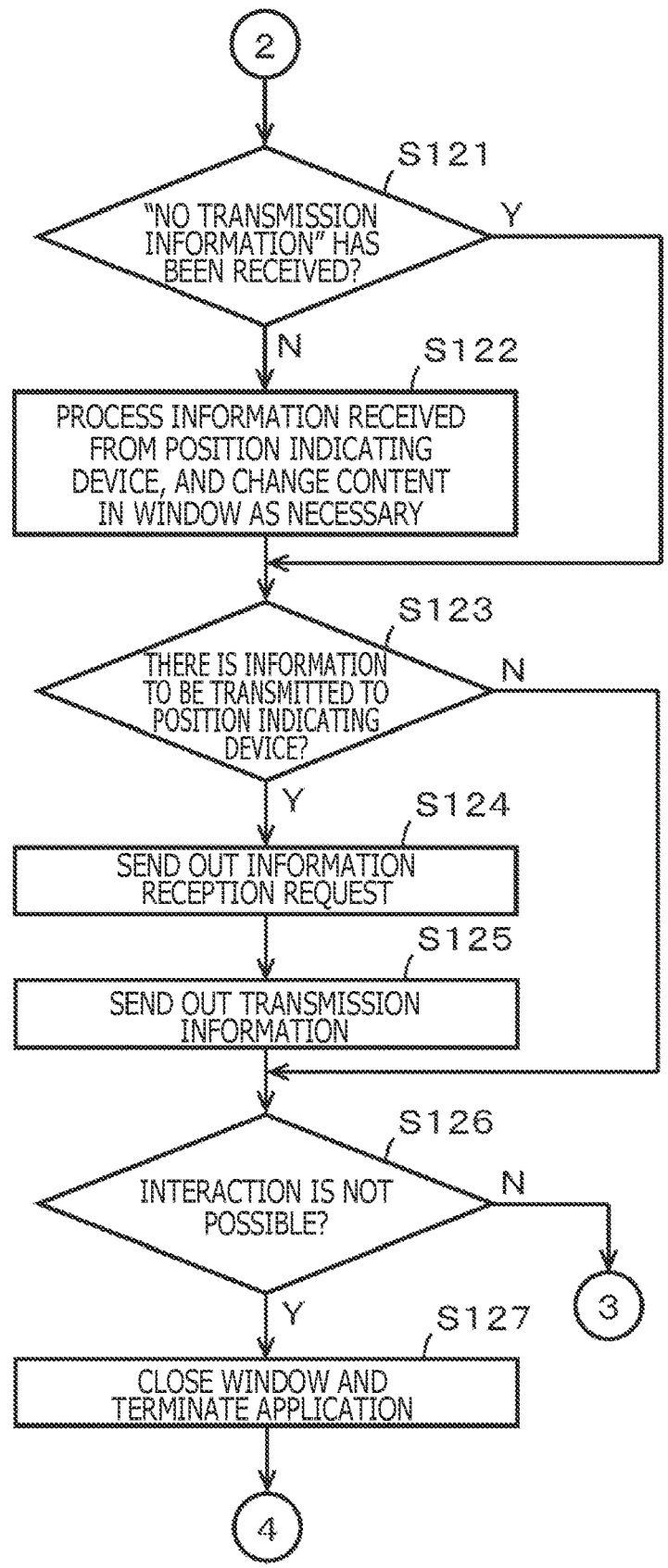
FIG. 17 represents a portion of the flowchart for explaining the example flow of the operation of the information processing apparatus of the display system according to an embodiment of this disclosure.

FIGS. 15, 16, and 17 are each a flowchart for explaining a flow of processes performed in the control circuit 101 of the information processing apparatus 1.

The control circuit 101 monitors whether or not the position detection sensor 11 has entered a state of being able to interact and exchange signals with the interaction circuit 3 of the position indicating device 2 (S101). In this embodiment, when the bottom surface 21a of the position indicating device 2 is placed in proximity to the display screen DS, the position indicating device 2 is magnetically attracted to the magnetic plate 13 of the information processing apparatus 1 through the magnets 22 disposed on the bottom surface 21a, so that the position detection sensor 11 enters the state of being able to interact and exchange signals with the interaction circuit 3 of the position indicating device 2.

If it is determined at S101 that the interaction has become possible, the control circuit 101 performs control to receive a signal from the position indicating device 2 via the position detection sensor 11 (S102). Then, the control circuit 101 acquires the information as to the position (i.e., a position indicated within the position detection region of the position detection sensor 11) on the display screen DS indicated by the position indicating device 2 and detected by the position detection circuit 104 (S103), and recognizes the device ID of the position indicating device 2 detected by the position detection circuit 104 (S104).

Next, the control circuit 101 activates the application associated with the device ID recognized at S104 (S105), and causes the window of the activated application to be displayed in the above-described manner with the position on the display screen DS indicated by the position indicating device 2 used as a reference (S106).

Next, the control circuit 101 determines whether or not an input made, with use of the mouse 1M or the keyboard 1K, onto a region of the displayed window has been accepted (S107), and, if it is determined that such an input has been accepted, causes information of the accepted input to be reflected in the display within the window and to be temporarily stored (S108). Note that, depending on the application, this information may be stored not temporarily but as information stored in the storage device 107.

If it is determined at S107 that such an input has not been accepted, or next to S108, the control circuit 101 determines whether or not the position indicated by the position indicating device 2 has been changed with the interaction being maintained (S111 in FIG. 16). If it is determined at S111 that the indicated position has been changed, the control circuit 101 changes the size of the window according to the change in the position indicated by the position indicating device 2, in the manner as described above with reference to FIGS. 13A to 13D (S112).

If it is determined at S111 that the indicated position has not been changed, or next to S112, the control circuit 101 determines whether or not rotation of the casing body portion 211 of the position indicating device 2 has been detected (S113). If it is determined at S113 that rotation of the casing body portion 211 of the position indicating device 2 has been detected, the control circuit 101 detects the direction and amount of the rotation (S114). Then, in the manner as described above with reference to FIGS. 14A to 14C, the control circuit 101 changes the size of the window according to the rotation of the casing body portion 211 of the position indicating device 2 on the basis of the direction and amount of the rotation detected at S114 (S115).

In this embodiment, the detection of the rotation of the casing body portion 211 of the position indicating device 2 at S113 and the detection of the direction and amount of the rotation at S114 are accomplished by detecting the direction of the inclination of the interaction circuit 3 of the position indicating device 2 and a change in the direction thereof as described above with reference to FIGS. 6, 7A, and 7B.

If it is determined at S113 that no rotation of the casing body portion 211 of the position indicating device 2 has been detected, or next to S115, the control circuit 101 transmits an information transmission request to the position indicating device 2 via, in this example, the position detection sensor 11 (S116). Then, the control circuit 101 waits for reception of information from the position indicating device 2 (S117). Note that the information transmission request may be transmitted to the position indicating device 2 not via the position detection sensor 11 but via the short-range wireless communication device 108, and that, in this case, the information is received from the position indicating device 2 via the short-range wireless communication device 108.

If the reception of the information from the position indicating device 2 is recognized at S117, the control circuit 101 determines whether or not the received information is indicative of "no transmission information" (S121 in FIG. 17).

If it is determined at S121 that the received information is not indicative of "no transmission information," the control circuit 101 processes the information received from the position indicating device 2 in the application being active, and changes the content displayed in the window as necessary (S122).

If it is determined at S121 that the received information is indicative of "no transmission information," or next to S122, the control circuit 101 determines whether or not there is information to be transmitted to the position indicating device 2 (S123). If it is determined at S123 that there is information to be transmitted to the position indicating device 2, the control circuit 101 sends out an information reception request to the position indicating device 2, thereby requesting the position indicating device 2 to receive the transmission information (S124), and sends out the transmission information (S125).

If it is determined at S123 that there is no information to be transmitted to the position indicating device 2, or next to S125, the control circuit 101 determines whether or not the position detection sensor 11 has not transitioned into a state of being unable to interact with the position indicating device 2 (S126). If it is determined at S126 that the interaction is still possible, the control circuit 101 causes control to return to S107, and repeats S107 and the subsequent processes. Meanwhile, if it is determined at S126 that the interaction is no longer possible, the control circuit 101 terminates the activated application, and closes the displayed window (S127). Next to S127, the control circuit 101 causes control to return to S101, and repeats S101 and the subsequent processes.

Example Operation of Position Indicating Device 2

Figure 18:
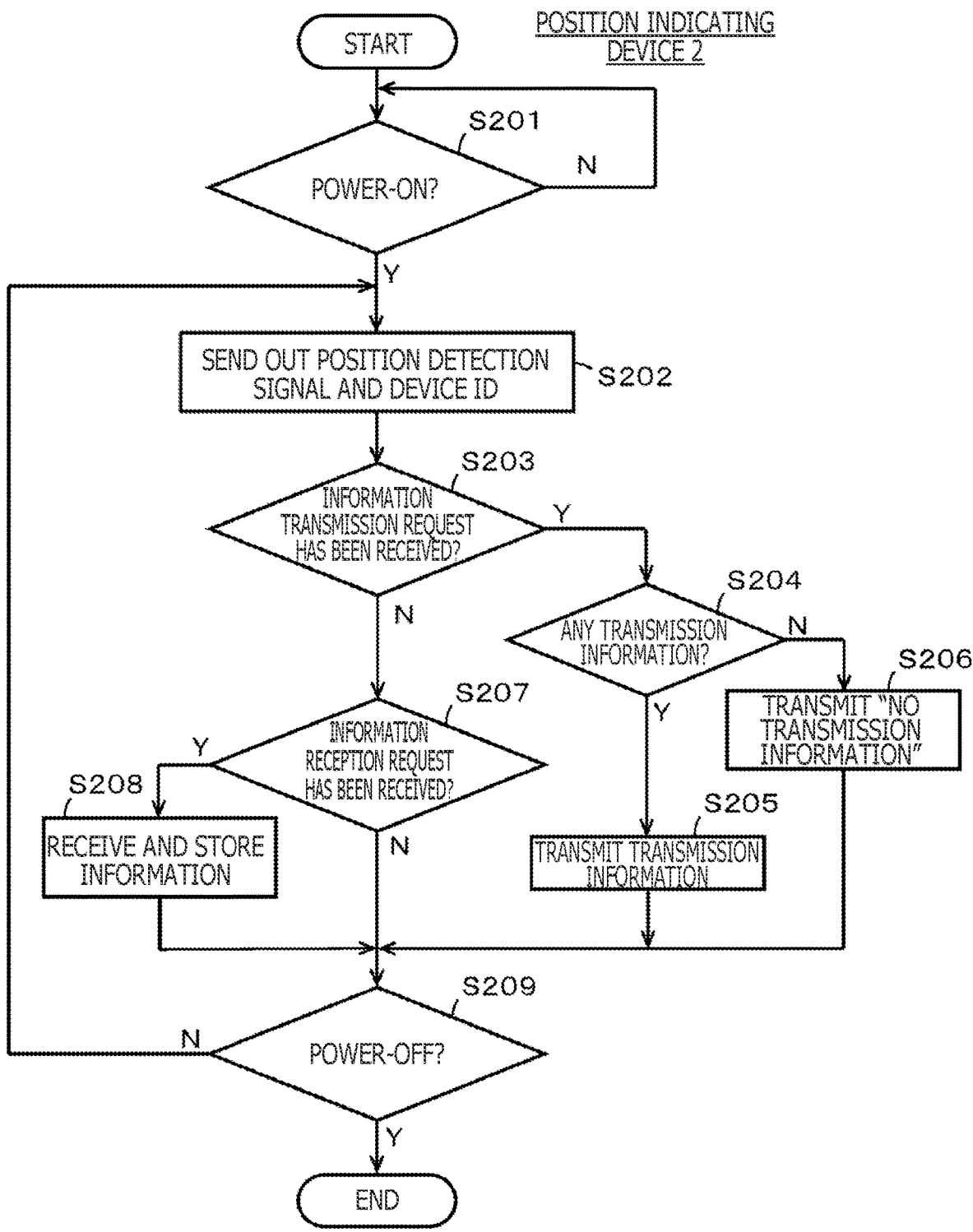
FIG. 18 represents a flowchart for explaining an example flow of an operation of the position indicating device of the display system according to an embodiment of this disclosure.

FIG. 18 is a flowchart for explaining a flow of processes performed in the control circuit 5 of the position indicating device 2.

The control circuit 5 monitors whether the push button 23 is depressed to turn on the power (S201), and, if power-on is recognized, performs control to send out the position detection signal and the device ID via the interaction circuit 3 (S202).

Next, the control circuit 5 determines whether or not the information transmission request has been received from the information processing apparatus 1 (S203), and, if it is determined that the information transmission request has been received, determines whether or not any transmission information is stored in the information storage device 8 (S204).

If it is determined at S204 that transmission information is stored in the information storage device 8, the control circuit 5 reads the transmission information therefrom, and transmits the transmission information to the information processing apparatus 1 via, in this example, the interaction circuit 3 and the position detection sensor 11 (S205). Meanwhile, if it is determined at S204 that no transmission information is stored in the information storage device 8, the control circuit 5 transmits information indicative of "no transmission information" to the information processing apparatus 1 via the interaction circuit 3 and the position detection sensor 11 (S206). Note that the transmission information or the information indicative of "no transmission information" may alternatively be transmitted to the information processing apparatus 1 via the short-range wireless communication device 6.

Next to S205 or S206, the control circuit 5 determines whether or not the push button 23 has been operated to turn off the power (S209), and, if it is determined that the power has not been turned off, causes control to return to S202, and repeats S202 and the subsequent processes. Meanwhile, if power-off is detected at S209, the control circuit 5 finishes this processing routine.

Meanwhile, if it is determined at S203 that no information transmission request has been received from the information processing apparatus 1, the control circuit 5 determines whether or not any information reception request has been received (S207). If it is determined at S207 that an information reception request has been received, the control circuit 5 performs control to receive information from the information processing apparatus 1, and store the information in the information storage device 8 (S208).

Meanwhile, if it is determined at S207 that no information reception request has been received, or next to S208, the control circuit 5 causes control to proceed to S209, and when it is determined that the power has not been turned off, the control circuit 5 causes control to return to S202, and repeats S202 and the subsequent processes, whereas, when power-off is detected, the control circuit 5 finishes this processing routine.

Display Systems According to Other Embodiments

Although it has been assumed that the information processing apparatus is a computer (e.g., a personal computer) in the above-described embodiment, this is not essential to this disclosure.

Figure 19:
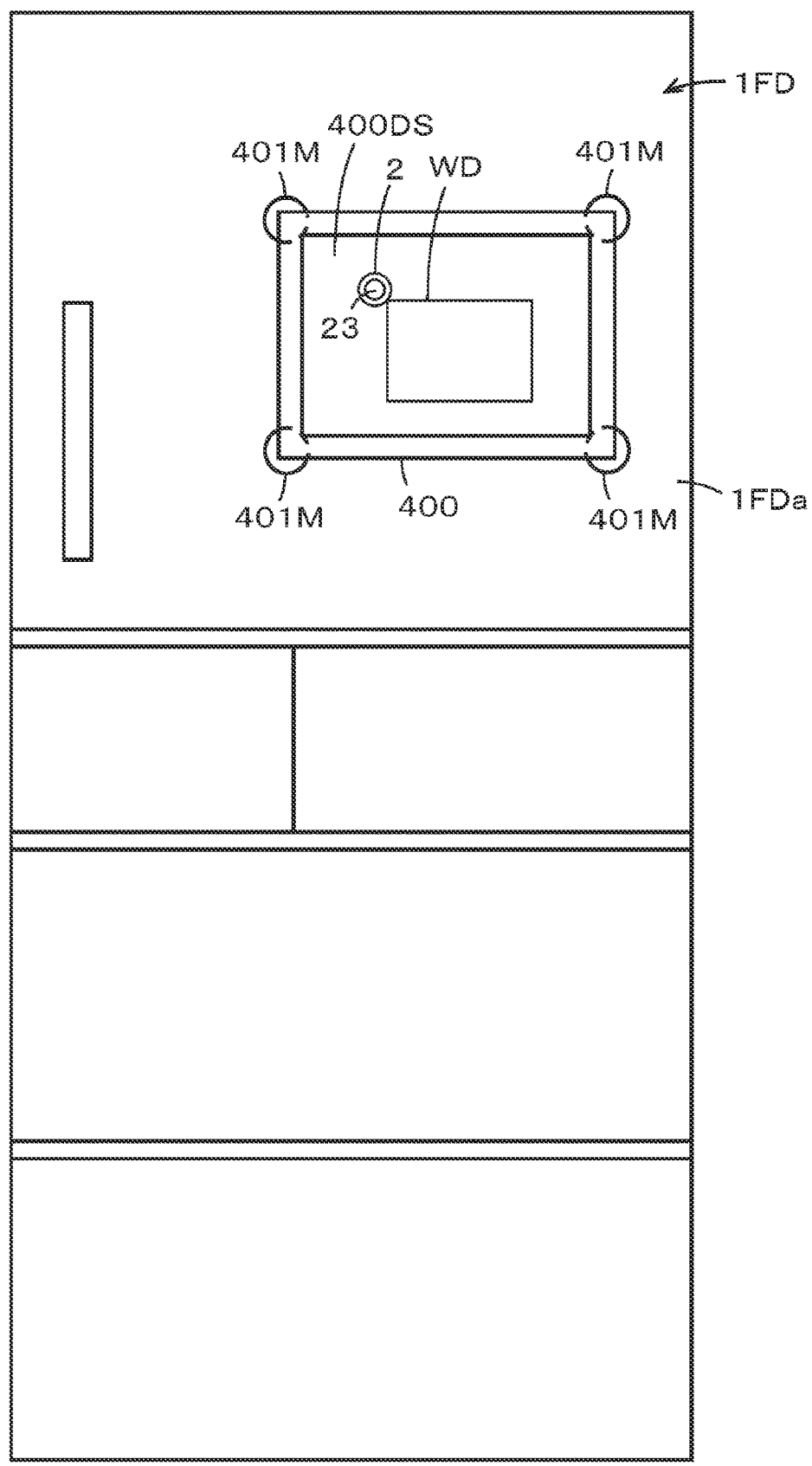
FIG. 19 is a diagram illustrating a display system according to another embodiment of this disclosure.

FIG. 19 illustrates a display system according to another embodiment of this disclosure. This display system includes an information processing apparatus including an information processing apparatus body 400. The information processing apparatus body 400 is attached to a top door 1FDa of an electric refrigerator 1FD when used. In this example, the information processing apparatus body 400 is formed by a slim tablet having a rectangular shape, and four corners thereof are securely attached to the top door 1FDa, which is made from, for example, an iron plate, through magnets 401M in this example. Needless to say, a method for the secure attachment of the information processing apparatus body 400 is not limited to the method involving use of the magnets. The slim tablet forming the information processing apparatus body 400 in this example has a structure similar to that of the above-described information processing apparatus body 10.

Further, with reference to FIG. 19, if any position indicating device 2 is magnetically stuck and thus attached to a front surface (i.e., a display screen) of the information processing apparatus body 400 and the push button 23 thereof is depressed, a window WD is displayed on the display screen of the information processing apparatus body 400.

In this example, a plurality of position indicating devices 2 are prepared, and various types of applications are registered in such a manner as to be associated with device IDs of the respective position indicating devices 2. Examples of the various types of applications include an application for exchanging chat messages between family members, an application for making access to the Web and displaying a cooking recipe (Web-based image display), and an application for displaying a calendar.

In a case where, for example, the application for exchanging chat messages between family members is registered in such a manner as to be associated with the device ID of the position indicating device 2 attached to the front surface of the top door 1FDa, message exchange as described below becomes possible. That is, if one of the family members writes a message in the displayed window WD associated with the device ID of the position indicating device 2, by using, for example, an electronic pen, this message is stored in the information storage device 8 of the position indicating device 2. If another one of the family members thereafter attaches the same position indicating device 2 to the front surface of the top door 1FDa, the message stored in the position indicating device 2 is displayed in the window that is displayed, so that the other family member can read the message.

Meanwhile, in the case of the application for displaying a recipe obtained from the Web, a list of names of dishes, for example, is displayed in the window WD, and if a user selects a particular one of the names of the dishes by using an electronic pen or the like, the electric refrigerator 1FD performs an operation of making access to the Internet via a wireless communication device to search for a recipe corresponding to the selected dish name and displaying the recipe obtained by the search in the window WD.

Meanwhile, in a case where the application for displaying a calendar is registered in such a manner as to be associated with the device ID of the position indicating device 2 attached to the front surface of the top door 1FDa, the calendar is displayed in the window WD.

Note that the information processing apparatus body 400 may alternatively be integrally embedded in the top door 1FDa of the electric refrigerator 1FD instead of being securely attached to the top door 1FDa of the electric refrigerator 1FD through the magnets or the like. In this case, a region of the top door 1FDa of the electric refrigerator 1FD in which the information processing apparatus body 400 is embedded forms a display screen.

In this case, if the position indicating device 2 is magnetically stuck and thus attached to the front surface of the top door 1FDa of the electric refrigerator 1FD and the push button 23 is depressed, the window WD is displayed on the display screen in the partial region of the top door 1FDa.

Figure 20:
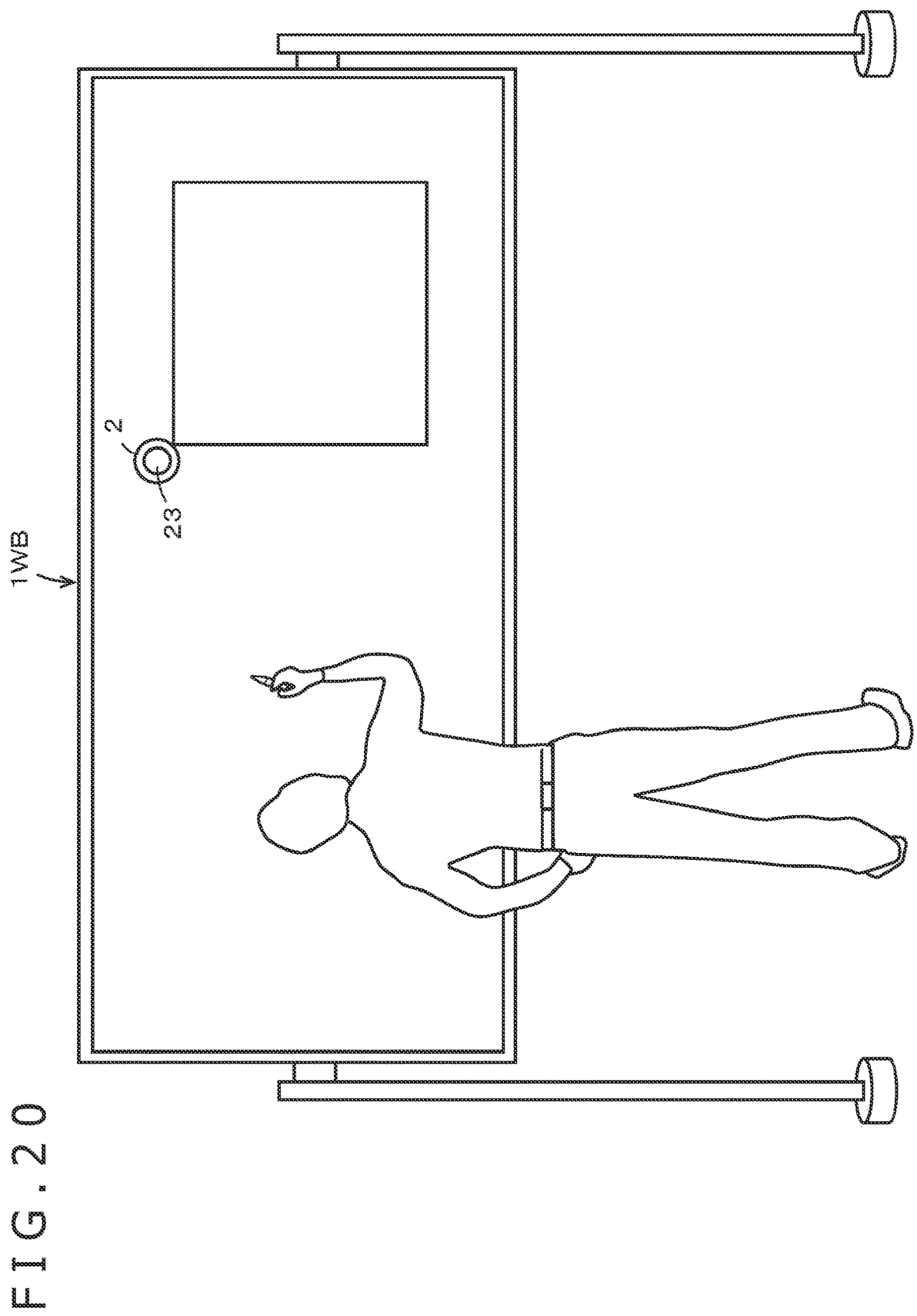
FIG. 20 is a diagram illustrating a display system according to still another embodiment of this disclosure.

FIG. 20 illustrates a display system according to still another embodiment of this disclosure, in which the information processing apparatus is formed by an electronic whiteboard 1IWB. In the embodiment illustrated in FIG. 20, the electronic whiteboard 1IWB includes an input surface serving as a display screen, and has a position detection sensor and a processing circuitry portion disposed on a rear side thereof, thus having a structure similar to that of the information processing apparatus body 10.

In this case, when a lecture is delivered or a discussion is conducted using the electronic whiteboard 1IWB, for example, information that serves as a material may be stored in the information storage device 8 of the position indicating device 2, and an application for displaying the information serving as the material may be registered in such a manner as to be associated with the device ID of the position indicating device 2. In this case, this material can be displayed in a window WD displayed on the electronic whiteboard 1IWB with a position at which the position indicating device 2 is attached thereto used as a reference.

In this case, the size of the window WD can easily be changed by moving the position indicating device 2 or rotating the casing body portion 211, which provides a convenience in that efficient use of a surface region of the electronic whiteboard 1IWB is made possible. Moreover, another convenience is provided in that the window WD can be opened and closed using the push button 23.

Figure 21:
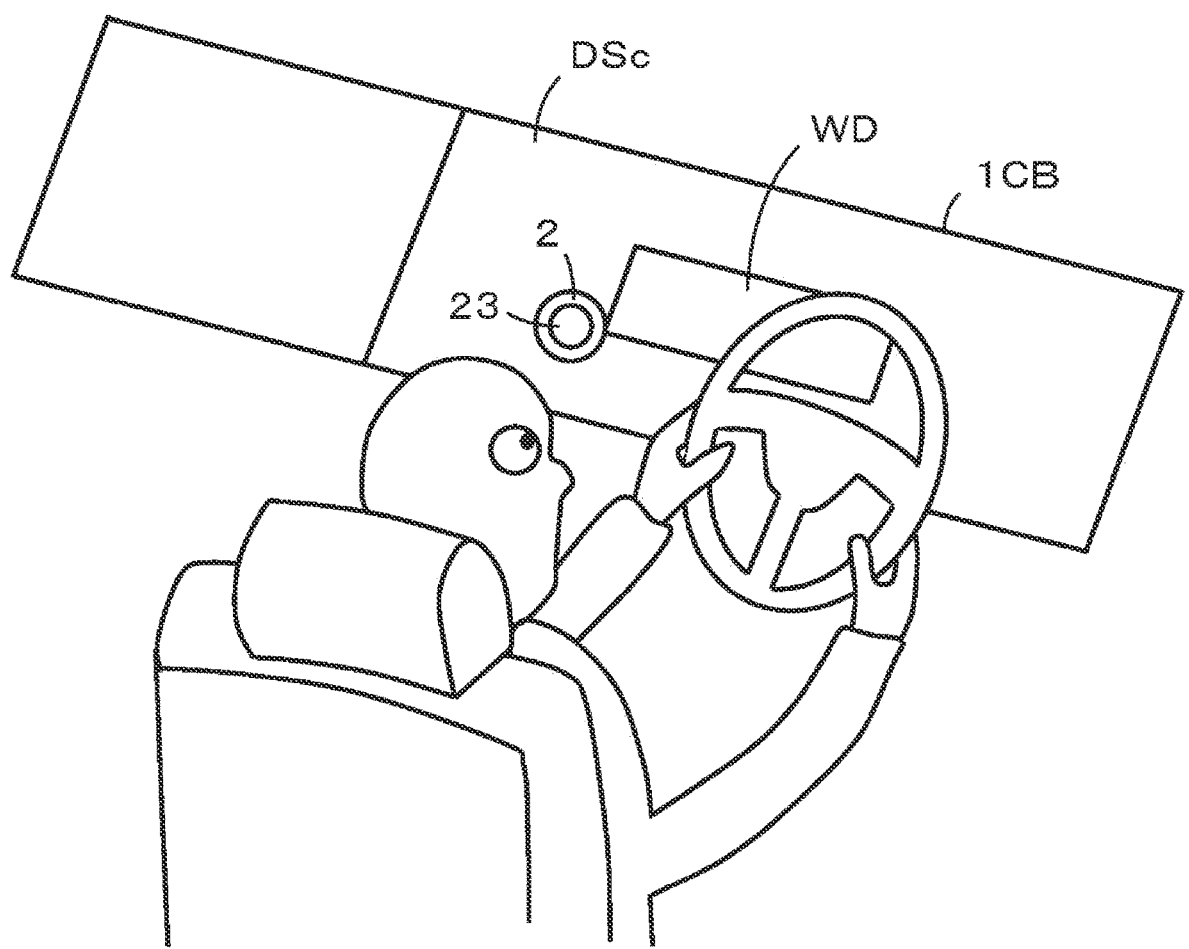
FIG. 21 is a diagram illustrating a display system according to yet another embodiment of this disclosure.

FIG. 21 illustrates a display system according to yet another embodiment of this disclosure, in which an information processing unit that is provided with a display screen DSc and that has a structure similar to that of the information processing apparatus body of the information processing apparatus according to the first embodiment is installed on a control panel 1CB in front of a driver's seat of an automobile. In this embodiment, a volume control function (application), a temperature control function (application) of an automobile air conditioner, or the like is registered in such a manner as to be associated with the device ID of the position indicating device 2, for example.

If the volume control function is registered in such a manner as to be associated with the device ID of the position indicating device 2 and a driver or a passenger attaches this position indicating device 2 to the display screen DSc, for example, a display image of a user interface for volume control is displayed in a window WD on the display screen DSc, or is displayed on the display screen DSc without the window WD. Thus, the driver or the passenger is able to perform a volume control operation, for example, without giving a stare, via the display image of the user interface, which provides convenience. Moreover, another convenience is provided in that the display image of the user interface for volume control can be displayed or cleared using the push button 23.

Display systems according to embodiments of this disclosure are applicable to various other devices as well as to the devices described above by way of example.

OTHER EMBODIMENTS OR MODIFICATIONS

Although, in the above-described embodiment, the position indicating device 2 is activated by operating the push button 23 to turn on the power thereof, a minimum driving power supply voltage may be supplied from the battery to the control circuit 5 even in a standby mode¬ and the control circuit 5 may be configured to detect turning on or off of the open/close switch 23S, which is operated in conjunction with the push button 23, to perform activation control and to cause the power supply voltage to be supplied from the battery to various portions as appropriate.

Also, for example, the position indicating device 2 may be configured to monitor whether a signal is received from the position detection sensor 11 via the central electrode 31 or the peripheral electrode 32 of the interaction circuit 3, and the control circuit 5 may be configured to perform control to cause the power supply voltage to be supplied from the battery to various portions of the position indicating device 2, thereby activating the position indicating device 2, when a signal has been received from the position detection sensor 11 as a result of, for example, the position indicating device 2 being attached to or placed in proximity to the display screen DS.

Also note that the switch to be operated in conjunction with the push button 23 is not limited to the activation switch for controlling the turning on or off of the power. For example, if the push button 23 is operated when the position indicating device 2 is in operation after the power thereof is turned on, this operation of the push button 23 may be handled as an operation similar to a left-click or right-click operation using a mouse pointer, for example.

For example, the information processing apparatus 1 may be configured to switch the content being displayed in the window WD, if the push button 23 is operated when the position indicating device 2 is in operation after the power thereof is turned on.

Also note that the push button 23 may not necessarily be a lock-type button as described above, but may alternatively be a non-lock button configured to toggle the state of the open/close switch 23S between the ON state and the OFF state each time the push button 23 is pressed.

Also note that, although the method in which the central electrode 31 of the interaction circuit 3 is inclined with respect to the bottom surface 21a is employed as the method for detecting rotation of the casing body portion 211 of the position indicating device 2 in the above-described embodiment, the method for detecting the rotation is not limited to this method.

For example, a plurality of interaction circuits 3 may be disposed in the casing body portion 211 of the position indicating device 2 such that the direction and amount of rotation of the casing body portion 211 can be detected on the basis of changes in a plurality of positions indicated by the plurality of interaction circuits 3. Specifically, for example, two interaction circuits 3 may be disposed such that tips of central electrodes thereof are positioned each on a diameter passing through the center of the circular bottom surface 21a of the position indicating device 2 and at an equal distance from the center, to enable detection of the rotation. In this case, positions indicated by the two interaction circuits 3 lie on a circle centered on the center of the circular bottom surface 21a, and therefore, the direction and amount of the rotation can be detected by detecting a change in at least one of the positions indicated by the two interaction circuits 3. Note that the direction and amount of the rotation can be detected even when the tips of the central electrodes of the two interaction circuits 3 are not arranged to lie at an equal distance from the center, if each of the positions of the two interaction circuits 3 can be grasped by the position detection circuit via the position detection sensor 11. This can be accomplished, for example, when signals to be sent out from the two interaction circuits 3 are arranged to have different frequencies.

Also note that a motion sensor, such as a gyroscopic sensor, may be disposed in the casing body portion 211 of the position indicating device 2 such that the direction and amount of the rotation of the casing body portion 211 can be detected from a motion detection output of the motion sensor.

Also, in the above-described embodiment, the position indicating device 2 is configured to transmit or receive information via the position detection sensor 11 when a transmission request or a reception request has been received from the information processing apparatus 1 via the position detection sensor 11, and to transmit or receive information via the short-range wireless communication device 6 when a transmission request or a reception request has been received from the information processing apparatus 1 via the short-range wireless communication device 6. Note, however, that the position indicating device 2 may alternatively be configured to transmit or receive information via the short-range wireless communication device 6 when a transmission request or a reception request has been received from the information processing apparatus 1 via the position detection sensor 11, and to transmit or receive information via the position detection sensor 11 when a transmission request or a reception request has been received from the information processing apparatus 1 via the short-range wireless communication device 6.

Also, in the above-described embodiment, the magnets are used to secure the position indicating device 2 to the display screen DS. Note, however, that the securing member for securing the position indicating device 2 to the display screen DS may not necessarily involve use of the magnets. For example, an adhesive allowing easy separation and capable of being repeatedly used for adhesion may be disposed on the bottom surface of the position indicating device, or alternatively, a suction cup or the like may be used.

Also, in a case where the display screen of the information processing apparatus is horizontally oriented, the position indicating device placed thereon will not fall off the display screen, and therefore, when the position indicating device 2 is used simply as a start trigger to display the window, i.e., when the position indicating device 2 is not secured and rotated, for example, the securing member, such as the magnets, is unnecessary. However, it is preferable that the securing member be used to secure the position indicating device to the display screen with stability.

Also note that the position indicating device 2 may not necessarily be disk-shaped or columnar in external appearance, but may alternatively have an exterior in the shape of a polygonal prism or in any other desirable shape.

Note that each of the position detection sensor of the information processing apparatus and the interaction circuit of the position indicating device is of a capacitive type in the above-described embodiment, but may alternatively be of an electromagnetic induction type.

It will be appreciated that the object to be displayed with the position indicated by the position indicating device used as a reference is not limited to the window, and may be a given display image.

It is to be noted that the embodiment of the present disclosure is not limited to the foregoing embodiments, and that various changes can be made without departing from the spirit of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display system, comprising:
a position indicating device; and
an information processing apparatus having a display screen and a sensor that, in operation, detects a position indicated by the position indicating device,
wherein the position indicating device includes:
a casing,
an interaction circuit disposed inside the casing, wherein the interaction circuit, in operation, exchanges a signal with the sensor of the information processing apparatus, and
a securing member that, in operation, secures the casing to the display screen of the information processing apparatus, and
wherein the information processing apparatus includes:
a position detection circuit that, in operation, detects the position indicated by the position indicating device in a state of the casing being secured to the display screen through the securing member, based on the signal exchanged by the interaction circuit of the position indicating device with the sensor of the information processing apparatus, and
a control circuit that, in operation, performs control to display a given display image on the display screen with the position indicated by the position indicating device and detected by the position detection circuit used as a reference.

2. The display system according to claim 1, wherein:
the information processing apparatus further includes a plate portion made of a magnetic material and disposed on a rear side of the display screen, and
the securing member of the position indicating device is formed using a magnet member that, in operation, is magnetically attracted and fastened to the plate portion to secure the casing to the display screen.

3. The display system according to claim 1, wherein:
the interaction circuit of the position indicating device and the sensor of the information processing apparatus interact with each other through capacitive coupling.

4. The display system according to claim 1, wherein:
the given display image is displayed on the display screen as an image that occupies a given region, and
the control circuit of the information processing apparatus, in operation, causes the given display image to be displayed such that the given region is within the display screen with the position detected by the position detection circuit used as the reference.

5. The display system according to claim 1, wherein:
the given display image is displayed on the display screen as an image that occupies a given region, and
the control circuit of the information processing apparatus, in operation, changes a size of the given region based on a change in the position detected by the position detection circuit.

6. The display system according to claim 1, wherein:
the information processing apparatus includes a rotation detection circuit that, in operation, detects rotation of the position indicating device in the state of the casing being secured to the display screen, based on a change in the position indicated by the position indicating device and detected by the position detection circuit, and
the control circuit, in operation, changes a size of the display image based on the rotation detected by the rotation detection circuit.

7. The display system according to claim 1, wherein:
the given display image is displayed on the display screen as an image that occupies a given region,
the information processing apparatus includes a rotation detection circuit that, in operation, detects rotation of the position indicating device in the state of the casing being secured to the display screen, based on a change in the position indicated by the position indicating device and detected by the position detection circuit, and
the control circuit, in operation, changes a size of the given region based on the rotation detected by the rotation detection circuit.

8. The display system according to claim 1, wherein:
the position indicating device includes:
a storage device that, in operation, stores unique identification information, and
a transmission circuit that, in operation, transmits the identification information to the information processing apparatus, and
the display image displayed by the information processing apparatus is associated with the identification information received from the position indicating device.

9. The display system according to claim 8, wherein:
the transmission circuit of the position indicating device, in operation, transmits the identification information to the information processing apparatus via the interaction circuit and the sensor.

10. The display system according to claim 8, wherein:
the position indicating device and the information processing apparatus each include a wireless communication device that, in operation, performs wireless communication, and
the transmission circuit of the position indicating device is formed by the wireless communication device of the position indicating device.

11. The display system according to claim 1, wherein:
the position indicating device includes:
a storage device that, in operation, stores unique identification information, and
a transmission circuit that, in operation, transmits the identification information to the information processing apparatus,
the information processing apparatus has an application stored such that the application is associated with the identification information of the position indicating device, and, based on the identification information received from the position indicating device, and
the information processing apparatus, in operation, activates the application associated with the identification information.

12. The display system according to claim 1, wherein:
the position indicating device includes:
a switch, and
a transmission circuit that transmits an operation state of the switch, and
the information processing apparatus, in operation, controls whether or not the display image is to be displayed, based on the operation state of the switch received from the position indicating device.

13. The display system according to claim 12, wherein;
the transmission circuit of the position indicating device, in operation, transmits the operation state of the switch to the information processing apparatus via the interaction circuit and the sensor.

14. The display system according to claim 12, wherein:
the position indicating device and the information processing apparatus each include a wireless communication device that, in operation, performs wireless communication, and
the transmission circuit of the position indicating device is formed by the wireless communication device of the position indicating device.

15. The display system according to claim 1, wherein:
the position indicating device includes:
a receiver that, in operation, receives information sent from the information processing apparatus, and
a storage device that, in operation, stores the information received by the receiver.

16. The display system according to claim 15, wherein:
the interaction circuit of the position indicating device and the sensor of the information processing apparatus interact with each other through capacitive coupling, and
the interaction circuit of the position indicating device includes a first electrode that, in operation, sends out a signal, and a second electrode that forms the receiver.

17. The display system according to claim 15, wherein:
the position indicating device includes a wireless communication device that, in operation, sends out information stored in the storage device.

18. The display system according to claim 15, wherein:
the position indicating device, in operation, transmits information stored in the storage device to the information processing apparatus via the interaction circuit and the sensor.

19. The display system according to claim 1, wherein:
the given display image is displayed on the display screen as an image that occupies a given region, and
the control circuit of the information processing apparatus, in operation, changes a position of the given region on the display screen according to a change in the position detected by the position detection circuit.

20. The display system according to claim 1, wherein:
the interaction circuit of the position indicating device and the sensor of the information processing apparatus interact with each other through electromagnetic induction.

\* \* \* \* \*